(12) United States Patent
Mimura et al.

(10) Patent No.: US 6,883,921 B2
(45) Date of Patent: Apr. 26, 2005

(54) RETROREFLECTION DEVICE

(75) Inventors: Ikuo Mimura, Uozu (JP); Yutaka Hamada, Namerikawa (JP)

(73) Assignee: Nippon Carbide Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/486,576

(22) PCT Filed: Aug. 9, 2002

(86) PCT No.: PCT/JP02/08187

§ 371 (c)(1),
(2), (4) Date: Feb. 10, 2004

(87) PCT Pub. No.: WO03/014779

PCT Pub. Date: Feb. 20, 2003

(65) Prior Publication Data

US 2005/0018292 A1 Jan. 27, 2005

(30) Foreign Application Priority Data

Sep. 8, 2001 (JP) .................................. 2001-241964

(51) Int. Cl.⁷ .............................................. G02B 5/122
(52) U.S. Cl. ...................................... 359/529; 359/530
(58) Field of Search ........................... 359/515, 529–546

(56) References Cited

U.S. PATENT DOCUMENTS

| | | | |
|---|---|---|---|
| 2,310,790 A | 4/1943 | Jungersen | 88/105 |
| 2,380,447 A | 7/1945 | Jungersen | 88/78 |
| 2,481,757 A | 9/1949 | Jungersen | 88/78 |
| 3,190,178 A | 6/1965 | McKenzie | 88/82 |
| 3,712,706 A | 1/1973 | Stamm | 350/103 |
| 3,830,682 A | 8/1974 | Rowland | 161/2 |
| 4,025,159 A | 5/1977 | McGrath | 350/105 |
| RE29,396 E | 9/1977 | Heenan | 204/281 |
| 4,349,598 A | 9/1982 | White | 428/161 |
| 4,498,733 A | 2/1985 | Flanagan | 350/102 |
| 4,588,258 A | 5/1986 | Hoopman | 350/103 |
| 4,775,219 A | 10/1988 | Appeldorn et al. | 350/103 |
| 4,801,193 A | 1/1989 | Martin | 350/103 |
| 4,897,136 A | 1/1990 | Bailey et al. | 156/145 |
| 5,064,272 A | 11/1991 | Bailey et al. | 359/541 |

(Continued)

FOREIGN PATENT DOCUMENTS

| | | |
|---|---|---|
| EP | 0175031 | 3/1986 |
| EP | 0137736 | 10/1992 |
| EP | 0548280 | 9/1994 |
| EP | 1164390 A | 12/2001 |
| GB | 441319 | 12/1933 |
| JP | 63/143502 | 6/1988 |
| JP | 11/305017 | 11/1999 |
| WO | 92/04647 | 3/1992 |
| WO | 94/14091 | 6/1994 |
| WO | 95/11463 | 4/1995 |
| WO | 95/11465 | 4/1995 |
| WO | 95/11470 | 4/1995 |
| WO | 96/10197 | 4/1996 |
| WO | 96/42025 | 12/1996 |
| WO | 01/42822 | 6/2001 |

*Primary Examiner*—Euncha P. Cherry
(74) *Attorney, Agent, or Firm*—Fitzpatrick, Cella, Harper & Scinto

(57) ABSTRACT

The first reflective lateral face of the first triangular-pyramidal retroreflective unit is on the same plane with the first lateral face of the tetrahedral retroreflective unit, the second reflective lateral face of the first triangular-pyramidal retroreflective unit is on the same plane with the second lateral face of the tetrahedral retroreflective unit, the third reflective lateral face of the first triangular-pyramidal retroreflective unit is parallel to one of the two lateral faces forming a V-shaped groove, the third reflective lateral face of the second triangular-pyramidal retroreflective unit is identical with, or parallel to, the other of the two faces forming said V-shaped groove, and the third reflective lateral face of said tetrahedral retroreflective unit is same as one of the two faces forming said V-shaped groove.

19 Claims, 17 Drawing Sheets

U.S. PATENT DOCUMENTS

| | | | |
|---|---|---|---|
| 5,138,488 A | 8/1992 | Szczech | 359/529 |
| 5,264,063 A | 11/1993 | Martin | 156/247 |
| 5,376,431 A | 12/1994 | Rowland | 428/164 |
| 5,557,836 A | 9/1996 | Smith et al. | 29/527.4 |
| 5,564,870 A | 10/1996 | Benson et al. | 409/131 |
| 5,600,484 A | 2/1997 | Benson et al. | 359/529 |
| 5,696,627 A | 12/1997 | Benson et al. | 359/529 |
| 5,706,132 A | 1/1998 | Nestegard et al. | 359/529 |
| 5,721,640 A | 2/1998 | Smith et al. | 359/530 |
| 5,764,413 A | 6/1998 | Smith et al. | 359/530 |
| 5,812,315 A | 9/1998 | Smith et al. | 359/529 |
| 5,814,355 A * | 9/1998 | Shusta et al. | 359/530 |
| 5,822,121 A | 10/1998 | Smith et al. | 359/530 |
| 5,831,767 A | 11/1998 | Benson et al. | 359/529 |
| 5,840,405 A | 11/1998 | Shusta et al. | 428/156 |
| 5,840,406 A | 11/1998 | Nilsen | 428/156 |
| 5,844,712 A | 12/1998 | Caroli | 359/529 |
| 5,854,709 A | 12/1998 | Couzin | 359/529 |
| 5,889,615 A | 3/1999 | Dreyer et al. | 359/529 |
| 5,898,523 A | 4/1999 | Smith et al. | 359/530 |
| 5,914,812 A | 6/1999 | Benson et al. | 359/529 |
| 5,926,314 A | 7/1999 | Smith et al. | 359/530 |
| 5,981,032 A | 11/1999 | Smith et al. | 428/167 |
| 5,988,820 A | 11/1999 | Huang et al. | 359/530 |
| 6,036,322 A | 3/2000 | Nilsen et al. | 359/529 |
| 6,083,607 A | 7/2000 | Mimura et al. | 428/167 |
| 6,155,689 A | 12/2000 | Smith | 359/530 |
| 6,206,525 B1 | 3/2001 | Rowland et al. | 359/530 |
| 6,318,866 B1 | 11/2001 | Mimura et al. | 359/530 |
| 6,390,629 B1 | 5/2002 | Mimura et al. | 359/530 |

* cited by examiner (A)

(B)

(A)

(B)

(A)

(B)

(A)

(B)

(A)

(B)

(A)

(B)

(A)

(B)

(A)

(B)

(A)

(B)

(A)

(B)

RETROREFLECTION DEVICE

TECHNICAL FIELD TO WHICH THE INVENTION BELONGS

This invention relates to a complex cube-corner retroreflective sheeting and retroreflective articles of novel structures. More particularly, the invention relates to a retroreflective device in which a large number of complex cube-corner retroreflective elements are arranged in closest-packed state, each of said complex cube-corner retroreflective elements having a first and second triangular-pyramidal retroreflective units and at least one tetrahedral retroreflective unit.

Specifically, the invention relates to a retroreflective device in which a large number of complex cube-corner retroreflective elements are arranged in closest-packed state, each of said complex cube-corner retroreflective elements having a first and second triangular-pyramidal retroreflective units and at least one tetrahedral retroreflective unit, which device is useful for signs such as traffic signs (commonly used traffic signs and delineators), road surface signs (pavement markers) and construction signs; number plates for vehicles such as automobiles and motorcycles; safety goods such as reflective tapes to be adhered to bodies of tracks or trailers, clothing and life preservers; marking on signboards; and reflective plates of visible light, laser-beams or infrared light-reflective sensors.

That is, the invention relates to a retroreflective device in which a large number of complex cube-corner retroreflective elements are arranged in closest-packed state, each of said complex cube-corner retroreflective elements having a first and second triangular-pyramidal retroreflective units and at least one tetrahedral retroreflective unit, characterized in that the three reflective lateral faces (a1, b1, c1 and a2, b2, c2) of each of the first and second triangular-pyramidal retroreflective units form mutually perpendicular cube-corner reflective surfaces, respectively, the first reflective lateral face (f11) of said at least one tetrahedral retroreflective unit, the second reflective lateral face (e11) and the third reflective lateral face (g11) thereof form a mutually perpendicular cube-corner reflective surfaces, said first reflective lateral face (a1) of the first triangular-pyramidal retroreflective unit is on the same plane with the first lateral face (f11) of said tetrahedral retroreflective unit, said second reflective lateral face (b1) of the first triangular-pyramidal retroreflective unit is on the same plane with the second lateral face (e11) of said tetrahedral retroreflective unit, said complex cube-corner retroreflective element has a quadrangular circumference defined by mutually parallel y-lines and mutually parallel z-lines, said complex cube-corner retroreflective element has a substantially symmetrical V-shaped groove with its center line x-x' passing through the points of intersection of said parallel y-lines and parallel z-lines, the third reflective lateral face (c1) of said first triangular-pyramidal retroreflective unit is parallel to one of the two lateral faces (g11) forming said V-shaped groove, the third reflective lateral face (c2) of said second triangular-pyramidal retroreflective unit is same as or parallel to the other (g21) of the two faces forming said V-shaped groove, and the third reflective lateral face (g11) of said tetrahedral retroreflective unit is same as one of the two faces forming said V-shaped groove.

PRIOR ART

Retroreflective sheetings and retroreflective articles which reflect incoming light rays toward the light sources are well known, and such sheetings whose retroreflectivity is utilized are widely used in the fields as above-described. Of those, particularly cube-corner retroreflective sheetings and retroreflective articles which utilize the retroreflective principle of cube-corner retroreflective elements such as triangular-pyramidal reflective elements exhibit drastically higher retroreflectivity of light compared with those of conventional micro glass bead retroreflective sheetings or retroreflective articles, and due to the excellent retroreflective performance their utility is yearly increasing.

Whereas, heretofore known triangular-pyramidal retroreflective element exhibits favorable retroreflectivity where an angle formed by its optical axis (an axis passing through the apex of the triangular-pyramidal and the point equidistant from the three faces which intersect with each other at an angle of 90° and constitute the triangular-pyramidal cube-corner retroreflective element) with an entering light (which angle is hereafter referred to as an entrance angle) is small. However, because of its principle of reflection, retroreflectivity of the element rapidly decreases as the entrance angle broadens (i.e., entrance angularity is inferior).

Furthermore, a light which enters into such a triangular-pyramidal reflective element surface at an angle less than the critical angle (ac) satisfying the total internal reflection condition, which is determined by the ratio of the refractive index of individual transparent medium constituting said triangular-pyramidal reflective element and the refractive index of ambient air, is not totally reflected at the interfaces of the element but is transmitted to the back of the element. Hence retroreflective sheetings and articles using triangular pyramidal reflective elements have a defect that they are generally inferior in entrance angularity.

On the other hand, because a triangular pyramidal retroreflective element can reflect a light ray toward the incoming direction of the same ray from over nearly the whole area of the element, the reflected light is not excessively diverged for such causes as spherical aberration, unlike micro glass bead reflective elements.

From practical standpoint, however, the narrow divergence angle of retroreflective light is apt to produce such an inconvenience, e.g., when light rays emitted from head lamps of a car are retroreflected by a traffic sign, the reflected light rays are difficult to be caught by the driver of the car at a position deviating from the incidental axis of the light. This kind of inconvenience is enhanced particularly as the car approaches near the traffic sign, because the angle (observation angle) formed by the incidental axis of the light and the axis (observation axis) connecting the driver and the point of reflection increases (i.e., observation angurality becomes inferior).

For improving entrance angurality or observation angurality of cube-corner retroreflective sheetings and retroreflective articles, in particular, triangular-pyramidal cube-corner retroreflective sheetings and retroreflective articles, many proposals have been made of old and various improving means have been investigated.

For example, U.S. Pat. No. 2,310,790 to Jungersen describes a retroreflective sheeting in which various forms of retroreflective elements are installed on a thin sheet. Triangular-pyramidal reflective units exemplified in said US Patent include those in which their optical axes are not tilted, the position of their apices corresponding to the center points of their respective triangular bases, and tilted triangular-pyramidal reflective units whose apices do not correspond to the center points of their respective triangular bases, and the patent states that the sheeting effectively reflects light rays toward an approaching car (improvement in entrance angularity).

As the size of the triangular-pyramidal reflective units, the same patent states, as the depth of the units, up to one tenth of an inch (2,540 µm). Furthermore, FIG. 15 of this US patent shows a triangular-pyramidal reflective unit pair whose optical axes are tilted in positive (+) directions as explained later, the angle of tilt (θ) of each optical axis being presumed to be approximately 6.5°, as calculated from the length ratio between the longer side and the shorter side of the triangular base of the shown triangular-pyramidal reflective unit.

Said US patent to Jungersen, however, contains no specific disclosure about extremely small size triangular-pyramidal reflective units as described later, or no disclosure or suggestion about the desirable size or tilt in optical axis of triangular-pyramidal reflective units for exhibiting excellent observation angularity or entrance angularity.

U.S. Pat. No. 3,712,706 to Stamm discloses a retroreflective sheeting and a retroreflector in which so called regular triangular-pyramidal cube corner retroreflective elements whose triangular bases are in the shape of regular triangles are arranged in the closest-packed state with said bases lying on a common plane of a thin sheet. This US patent to Stamm specularly reflects incident light by vapor depositing a metal such as aluminum or reflective surfaces of the reflective elements, to increase the incident angle, whereby improving the problem such as the drop in retroreflective efficiency and such a drawback that an incident light entered at an angle less than the total internal reflection condition transmits through interfaces of the elements and does not retroreflect.

However, because the above proposal by Stamm provides a specular layer on reflective lateral faces as a means to improve wide angularity, such drawbacks as that appearance of the formed retroreflective sheeting and retroreflector is apt to become dark, or the metal used for the specular layer such as aluminum or silver is oxidized during use by infiltrated water or air, which leads to occasional decrease in reflectivity. Furthermore, this patent is entirely silent on the means for improving wide angularity by tilting optical axes.

EP 137,736 B1 to Hoopman describes a retroreflective sheeting and retroreflector in which multitude of pairs of tilted triangular-pyramidal cube-corner retroreflective elements having their bases on a common plane are arranged at the highest density on a thin sheet, each pair of said elements having isosceles triangular bases and being rotated 180° from one another. The optical axis of the triangular-pyramidal retroreflective element as described in this patent is tilted in negative (−) direction in the sense described in the present specification, the angle of tilt being about 7°–13°.

U.S. Pat. No. 4,138,488 to Szczech also discloses a retroreflective sheet and retroreflective article, in which tilted triangular-pyramidal cube-corner retroreflective elements each having an isosceles triangular base are arranged on a thin sheet in such a manner that their bases are on a common plane at the highest density. In this US patent, optical axes of each two triangular-pyramidal reflective elements, which face each other and form a pair, are tilted toward the common edge therebetween, i.e., in the positive (+) direction as later explained, the angle of tilt being about 2°–5° and the element height being 25 µm–100 µm.

Also in EP 548,280 B1 corresponding to the above patent states that the direction of tilt in the optical axes is such that the distances between the apex of the element and a plane, which contains the common edge of said pair of elements and is perpendicular to the common base plane, is not equal to the distance between said plane and the point of intersection of the optical axis with the common plane, the angle of tilt being about 2°–5° and the element height being 25 µm–100 µm.

As above, EP 548,280 B1 to Szczech proposes an angle of tilt of the optical axis within a range of about 2°–5°, inclusive of both positive (+) and negative (−) regions. Examples given in said US patent and EP patent to Szczech, however, disclose only those triangular-pyramidal reflective elements with their optical axes canted with an angle of tilt of (−) 8.2°, (−) 9.2° or (−) 4.3°, having an element height (h) of 87.5 µm.

Those triangular-pyramidal cube-corner retroreflective elements known from so far described U.S. Pat. No. 2,481,757 to Jungersen, U.S. Pat. No. 3,712,706 to Stamm, EP 137,736 B1 to Hoopman, U.S. Pat. No. 5,138,488 and corresponding EP 548,280 B1 to Szczech have the features in common, as illustrated in FIG. 3, that the multitude of triangular-pyramidal reflective elements, which play the kernel role in receiving entering light and reflecting the same, have their bases positioned in a common plane and that each of matched pairs facing with each other have similar configuration and equal height. Such retroreflective sheets and articles constructed of triangular-pyramidal reflective elements with their bases positioned in a common plane are invariably inferior in entrance angularity, i.e., they are subject to a defect that retroreflectivity rapidly drops with increased entrance angle of light rays entering into the triangular-pyramidal reflective elements.

Furthermore, retroreflective element arrays including asymmetrical retroreflective element pairs, V-shaped grooves extending in three directions not intersecting at any one point are also known.

U.S. Pat. Nos. 5,831,767 and 5,557,836 to Benson, et al. disclose retroreflective articles and methods of preparation thereof, which are proposed for the purpose of improving retroreflective efficiency and wide angurality, said articles being constructed of retroreflective element arrays bounded by asymmetric V-shaped grooves in which one of the side walls has an angle approximately perpendicular or close thereto with the base plane.

In these Benson, et al.'s retroreflectors, as shown in said US patents, a substrate is so machined that two sets of tilted V-shaped grooves of different directions form rhombic bases and another of set of tilted V-shaped grooves of still different direction are cut not to pass any point of intersection of said rhombic base pattern. By varying the crossing angle, depth, angle of V-shape and degree of tilt in the V-shape each of the first and second sets of grooves extending in two different directions; and the off-set position, number of grooves, depth, angle of V-shape and extent of tilt in the V-shape of the third set of grooves of a still different direction, large varieties of reflecting elements including those not exhibiting retroreflectivity can be formed, which constitute the retroreflector.

Furthermore, it is clearly indicated because one side wall surface of each V-shaped groove in the retroreflective article of Benson, et al. is approximately perpendicular to the base plane to form an asymmetrical V-shaped groove, the intermediate configuration of the elements having the rhombic bases as defined by said V-shaped grooves extending in two different directions is bilaterally asymmetrical as shown in FIG. 2 attached to this specification, and at that intermediate stage the reflective lateral surfaces are a2 and b2 in said FIG. 2. Whereas, the intermediate shape in conventional art is formed by symmetrical V-shaped grooves as shown in FIG. 1, and the reflective lateral surfaces formed are symmetrical, paired surfaces (a1, b1, and a2, b2). Hence those reflective elements of conventional art formed via the FIG. 1 stage become a pair of symmetrical triangular-pyramidal cube-corner element pair facing with each other as illustrated in FIG. 3 when a pair of surfaces (a1, b1 and a2, b2) are cut off with the third V-shaped groove. By contrast, cube-corner elements in Benson, et al.'s retroreflective article, which are formed as plural V-shaped grooves are cut, do not form any pair, as illustrated in FIG. 4. FIG. 6 shows an example of the retroreflective element array as shown in FIG. 30 of Benson, et al.'s U.S. Pat. No. 5,831,767.

In such a reflective element array, optical axes of any two reflective elements facing with each other across a V-shaped groove are alined in identical direction, as understood from their configuration. For example, where the optical axes are tilted, they are tilted in a same direction. Consequently, although a certain extent of improvement in observation angularity can be expected due to divergence of reflective light attributable to versatility of the reflective elements, in respect of entrance angularity the reflective element array has very high directivity. That is, in the direction to which their optical axes are tilted, excellent entrance angularity can be expected, but the array must have inferior entrance angularity in other directions.

U.S. Pat. No. 5,889,615 to Dreyer, et al. shows retroreflective element pair having plural optical axes constituted of a pair of a triangular-pyramidal cube-corner element and a tent-type cube-corner element, which is formed of a pair of triangular-pyramidal cube-corner reflective elements having one base edge in common and confronting with each other, with their apices cut off with another V-shaped groove extending in parallel with said common base edge. FIG. 5 attached to the present specification shows four sets of said retroreflective element pairs arranged in the closest-packed state.

This retroreflective element of Dreyer, et al. has plural optical axes which turn to mutually different directions. Hence, light rays coming from the directions corresponding to those of optical axes of particular retroreflective elements are effectively reflected by the particular elements, but other elements show markedly decreased reflection efficiency, and as a whole the retroreflective article has to show inferior retroreflective characteristics.

U.S. Pat. No. 4,775,219 to Appeldorn, et al. discloses a retroreflective article which carries on one surface an array of cube-corner retroreflective elements, the three lateral reflecting faces of the elements being formed by three intersecting sets of V-shaped grooves, at least one of the sets including, in a repeating pattern, at least two groove side angles that differ from one another, whereby the array of cube-corner retroreflective elements is divided into repeating sub-arrays that each comprise a plurality of cube-corner retroreflective elements in a plurality of distinctive shapes that retroreflect incident light in distinctively shaped light patterns.

The retroreflective sheeting obtained according to the above proposal by Appeldorn, et al. shows improved observation angularity to a certain extent, but is insufficient as to improvement in entrance angularity.

U.S. Pat. No. 5,764,413 to Smith, et al. discloses a tiled cube-corner retroreflective sheeting comprising a substrate having a base surface and a structured surface displaced from the base surface, the structured surface including at least two distinct arrays of cube corner elements, wherein: each cube corner array is formed by three intersecting sets of substantially parallel grooves including a primary groove set and two secondary groove sets, for at least one cube corner array, the secondary groove sets intersect each other to define an included angle less than 60°; and a major portion of substantially every groove in the primary groove set of the at least one cube corner array is disposed in a plane that intersects the edge of the sheeting at an acute angle selected from the group of angles consisting of 5 to 25°, 35 to 55°, and 65 to 85°.

U.S. Pat. No. 5,812,315 discloses a retroreflective cube corner article formed from a substantially optically transparent material, comprising: a substrate having a base surface disposed in a base plane; a structured surface displaced from the base surface and including an array of canted cube corner element matched pairs formed by three mutually intersecting sets of substantially parallel grooves, each matched pair including a first cube corner element and an optically opposing second cube corner element, wherein: a plurality of cube corner elements in the array have their symmetry axes canted in a first plane through a cant angle measuring between 4° and 15°; the article exhibits its broadest range of entrance angularity in a second plane, angularly displaced from the first plane; and the cube corner elements are oriented such that the second plane intersects an edge of the article at an angle less than 15°.

Furthermore, U.S. Pat. Nos. 5,822,121 and 5,926,314 disclose cube-corner articles wherein a plurality of cube corner elements in the array as above-described comprise a base triangle bounded by one groove from each of the three intersecting groove sets, the base triangle being scalene.

While these proposals by Smith, et al. can achieve improvement in entrance angularity by specifying the angle of the products with the outer edge of the sheeting or by providing at least two arrays, the products have a defect that reduction in frontal reflectivity is notable with the retroreflective elements with heavily canted optical axes.

Problem to be solved by the invention

Generally as the basic optical characteristics desirable for triangular-pyramidal retroreflective sheeting and retroreflective article, high reflectivity, i.e., high level (magnitude) of reflectivity represented by the reflectivity of light entering from the front of the sheeting, and wide angularity are required. Moreover, concerning the wide angularity, three properties, i.e., observation angularity, entrance angularity and rotation angularity, are required. Of these three properties, improvement in entrance angularity is known to be accomplished by tilting optical axes of retroreflective elements, i.e., entrance angularity in the direction of tilt of the optical axes is improved. Whereas, excessive tilt in optical axes increases the areal ratio among the reflective lateral faces constituting each element, which leads to reduction in retroreflective efficiency toward light source via trihedral reflection, presenting a technical problem.

Means to solve the problem

I now have discovered that entrance angularity could be markedly improved by a retroreflective device in which a large number of complex cube-corner retroreflective elements are arranged in closest-packed state, each of said complex cube-corner retroreflective elements having a first and second triangular-pyramidal retroreflective units and at least one tetrahedral retroreflective unit, characterized in that the three reflective lateral faces (a1, b1, c1 and a2, b2, c2) of each of the first and second triangular-pyramidal retroreflective units form mutually perpendicular cube-corner reflective surfaces, respectively, the first reflective lateral face (f11), the second reflective lateral face (e11) and the third reflective lateral face (g11) of said at least one tetrahedral retroreflective unit form a mutually perpendicular cube-corner reflective surfaces, said first reflective lateral face (a1) of the first triangular-pyramidal retroreflective unit is on the same plane with the first lateral face (f11) of said tetrahedral retroreflective unit, said second reflective lateral face (b1) of the first triangular-pyramidal retroreflective unit is on the same plane with the second lateral face (e11) of said tetrahedral retroreflective unit, said complex cube-corner retroreflective element has a quadrangular circumference defined by mutually parallel y-lines and mutually parallel z-lines, said complex cube-corner retroreflective element has a substantially symmetrical V-shaped groove with its center line x-x' passing through the points of intersection of said parallel y-lines and parallel z-lines, the third reflective lateral face (c1) of said first triangular-pyramidal retroreflective unit is parallel to one of the two lateral faces (g11) forming said V-shaped groove, the third reflective lateral face (c2) of said second triangular-pyramidal retroreflective unit is same as or parallel to the other (g21) of the two faces forming said V-shaped groove, and the third reflective lateral face (g11) of said tetrahedral retroreflective unit is same as one of the two faces forming said V-shaped groove.

WORKING EMBODIMENTS OF THE INVENTION

Before explaining the present invention, known prior art technologies are explained.

Figure 7:
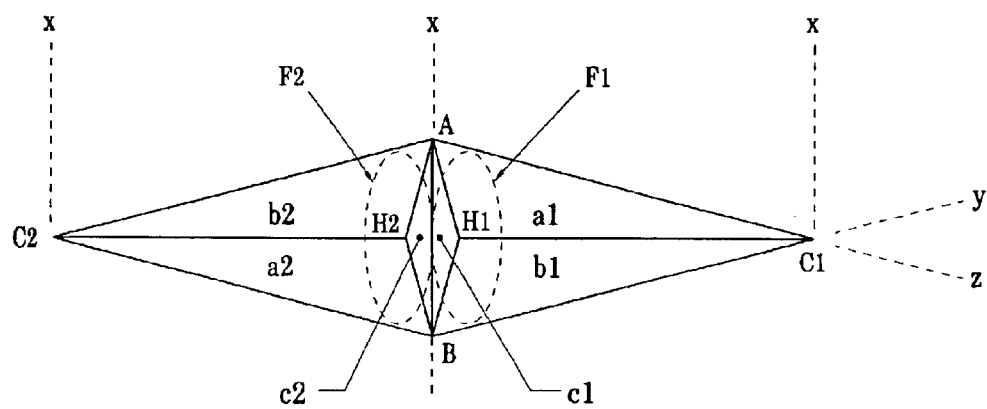
FIG. 7 shows a plan view and cross-sectional view of a retroreflective element pair according to a conventional technology.
Figure 7:
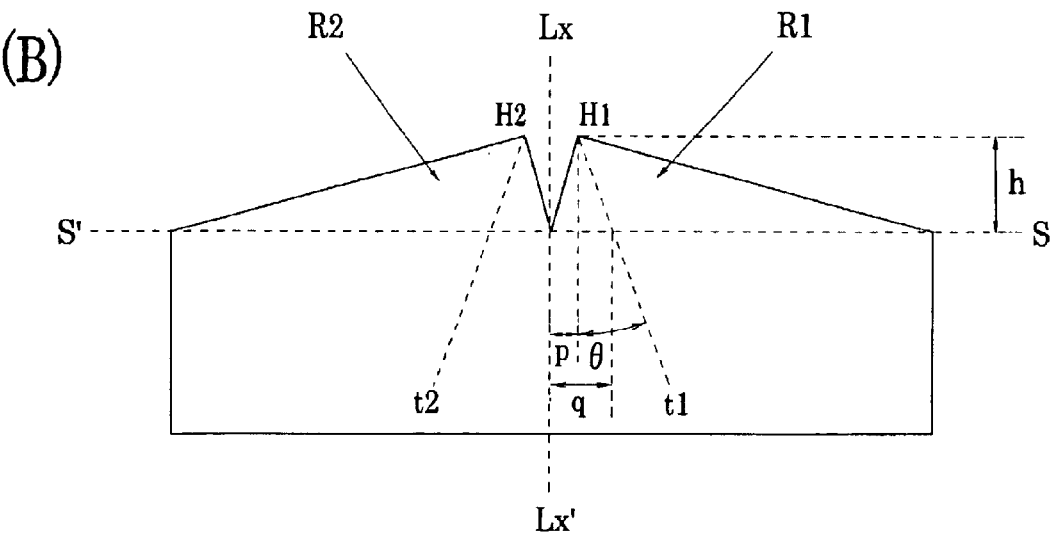

FIGS. 7(A) and 7(B) are a plan view and cross-sectional view for explaining a triangular-pyramidal cube-corner retroreflective element according to conventional technology, for comparison with a complex cube-corner retroreflective element of the present invention (which may be hereafter referred to simply as a complex reflective element).

FIG. 7(A) shows triangular-pyramidal cube-corner retroreflective elements projecting on a common plane with their bases arranged in the closest-packed state on said common plane (S-S') as multiple element pairs each having one base line (x, x . . . ) in common and facing with each other approximately symmetrically at equal height with respect to a plane (Lx-Lx') perpendicular to a common plane (S-S') including said common base lines (x, x . . . ) of said many elements.

FIG. 7(B) shows the cross-section of said pair of reflective elements among the triangular-pyramidal reflective element group shown in FIG. 7(A). The element pair consists of canted triangular-pyramidal cube-corner retroreflective elements whose optical axes are tilted in the directions exactly opposite to each other, the optical axes tilting toward said perpendicular plane (Lx-Lx'), i.e., in such directions that the respective differences between the respective distances (p1, p2) from the points of intersection (P1, P2) of perpendicular lines drawn from apices (H1, H2) of the pair of elements toward the base plane (S-S') with said base plane (S-S') to the base line (x, x . . . ) shared in common by said pair of elements, and the respective distances (q1, q2) from the points of intersection (Q1, Q2) of the optical axes with said base plane (S-S') to said base line (x, x . . . ) shared in common by the element pair, i.e., (q1-p1, q2-p2), take positive (+) values. Each of these element pairs share a base line (x) in common and face each other in the optically similar shapes as rotated 180° from one another. The two triangular-pyramidal reflective elements have equal height (h1, h2).

Figure 8:
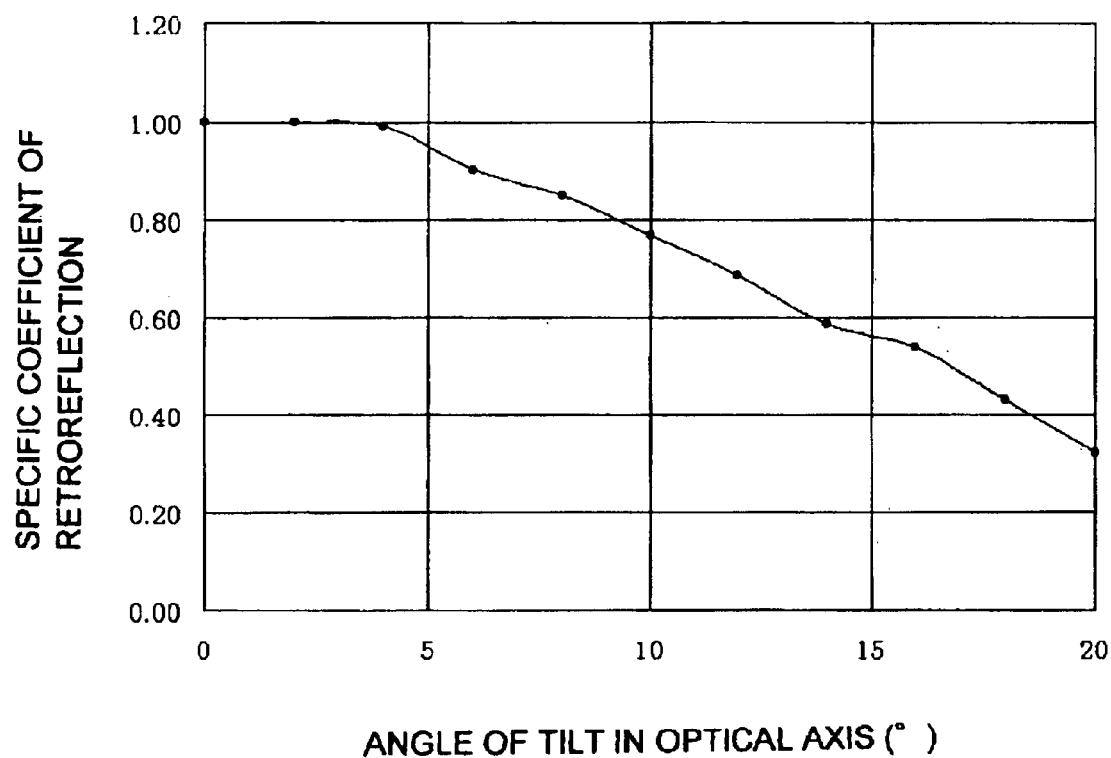
FIG. 8 is a graph showing the relationship of angle of tilt in optical axis versus retroreflection efficiency.

With increased tilt in the optical axis of above triangular-pyramidal cube-corner reflective element, the areal ratios between one lateral face (c1) of said element to the other lateral faces (a1, b1) also increase. Hence, a retroreflective element whose optical axis is excessively tilted must have a reduced probability for entering light to be retroreflected via trihedral reflection and its retroreflective efficiency inavoidably drops. The concept is explained referring to FIG. 7(A). Within the oval portions (F1, F2) shown in the figure, an incoming light can be effectively retroreflected, while the rest of the portions markedly less contribute to retroreflection. The relevancy of angle of tilt in optical axis with specific coefficient of retroreflection where the coefficient of reflection of light entering at an incident angle of 5° into a retroreflective element with untilted optical axis is made 1, as determined by the inventor's ray-tracing computer simulation is shown in FIG. 8. The more the optical axis is tilted, the less becomes the specific coefficient of retroreflection, and it is demonstrated that the specific coefficient of retroreflection of a retroreflective element with its optical axis tilted by 15° drops to about 50% that of the retroreflective element with untilted optical axis.

The invention is explained in further details hereinafter, referring to the drawings time to time where appropriate.

Figure 9:
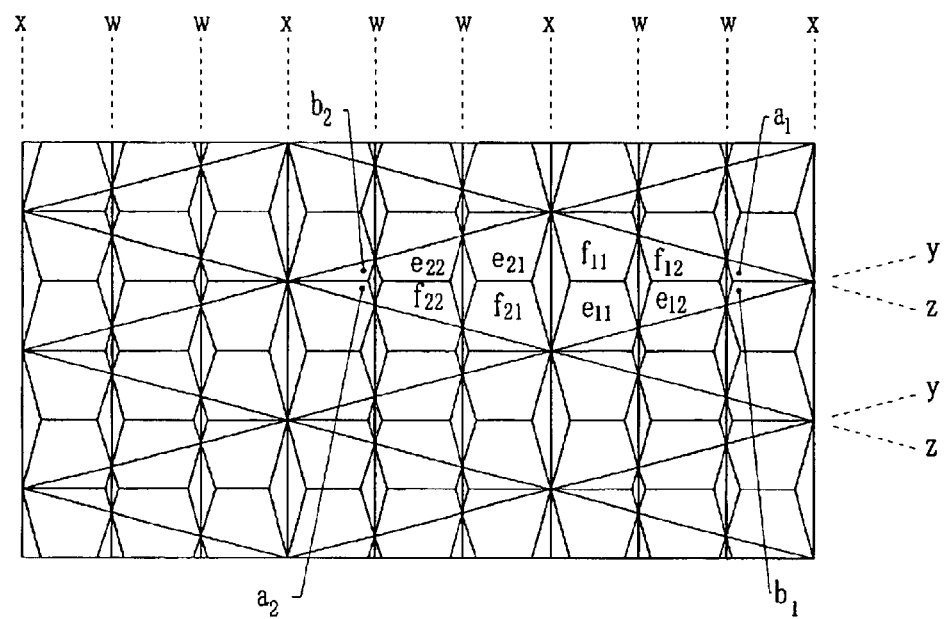
FIG. 9 shows a plan view and cross-sectional view of a retroreflective device according to the present invention.
Figure 9:
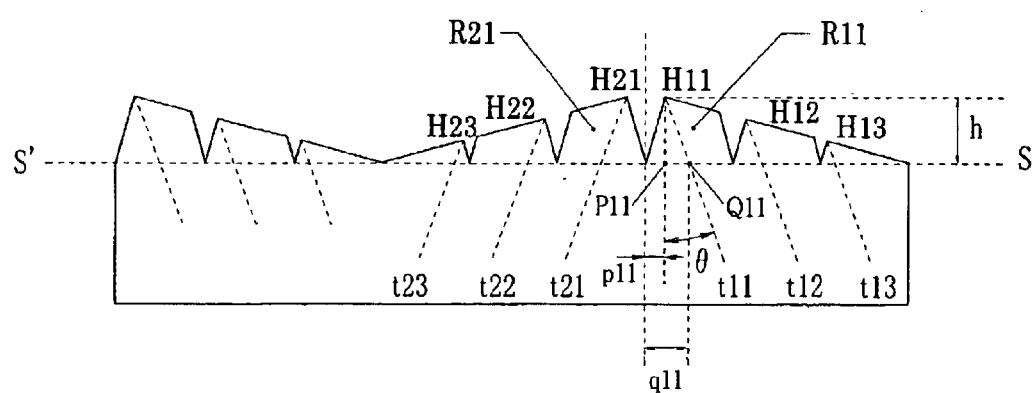

FIGS. 9(A) and 9(B) show a plan view and cross-sectional view to explain one embodiment of retroreflective element device according to the present invention. FIGS. 10(A) and 10(B) show one pair of the complex cube-corner retroreflective elements taken out from the device illustrated in FIGS. 9(A) and 9(B).

These figures show a retroreflective device in which many complex cube-corner retroreflective elements, each comprising first and second triangular-pyramidal retroreflective units and at least two pairs of tetrahedral retroreflective units, are disposed in the closest-packed state, said device being characterized in that the three reflective lateral faces (a1, b1, c1 and a2, b2, c2) of each of the first and second triangular-pyramidal retroreflective units form mutually perpendicular cube-corner reflective surfaces, respectively, the first reflective lateral faces (f11, f12 and f21, f22), the second reflective lateral faces (e11, e12 and e21, e22) and the third reflective lateral faces (g11, g12 and g21, g22) of said two tetrahedral retroreflective units form mutually perpendicular cube-corner reflective surfaces, respectively, said first reflective lateral face (a1) of the first triangular-pyramidal retroreflective unit is on the same plane with the first lateral faces (f11 and f12), respectively, of said tetrahedral retroreflective units, said second reflective lateral face (b1) of the first triangular-pyramidal retroreflective unit is on the same plane with the second lateral faces (e11, e12) of said tetrahedral retroreflective units, said complex cube-corner retroreflective element has a quadrangular circumference defined by mutually parallel y-lines and mutually parallel z-lines, said complex cube-corner retroreflective element has a substantially symmetrical V-shaped groove with its center line x-x' passing through the points of intersection of said parallel y-lines and parallel z-lines, the third reflective lateral face (c1) of said first triangular-pyramidal retroreflective unit is parallel to one (g11) of the two lateral faces forming said V-shaped groove, the third reflective lateral face (c2) of said second triangular-pyramidal retroreflective unit is parallel to the other (g21) of the two faces forming said V-shaped groove, and the third reflective lateral face (g11) of said tetrahedral retroreflective unit is same as one of the two faces forming said V-shaped groove.

Whereby formed three pairs of cube-corner retroreflective units, optical axes of each pair having substantially same tilt (θ) in respect of the common base line (x) although differing in direction by 180° to each other, constitute the complex cube-corner retroreflective element.

FIGS. 9(B) and 10(B) show cross-sections of each pair of the complex cube-corner retroreflective elements as shown in FIGS. 9(A) and 10(A). The pair of elements are tilted complex cube-corner retroreflective elements and optical axes of each element forming the pair (t11, t12, t13 and t21, t22, t23, respectively) are tilted in the exactly opposite directions. Explaining the tile referring to the element at the right in the drawing, its optical axis is tilted by an angle θ to a plane (Lx-Lx') perpendicular to the base plane (S-S') including the common base lines (x, x, x . . . ) in such a direction that the difference (q11-p11) between the distance (p11) from a point of intersection (P11) of a perpendicular line drawn from the apex (H11) of said element toward the base plane (S-S') with said base plane, to the base lines (x, x . . . ) shared in common by the element pair, and the distance (q11) from the point of intersection (Q11) of the optical axis passing said apex (H11) with said base plane to the base lines (x, x . . . ) shared in common by the element pair, takes a positive (+) value. In these element pairs, heights of the first and second triangular-pyramidal reflective units in the forms rotated by 180° to one another in respect of the common base line (x) is the same, as so are the heights of respectively matched tetrahedral retroreflective units.

Because the complex cube-corner retroreflective elements used in the invention can contain plural optical axes (t11, t12, t13 and t21, t22, t23 in FIG. 10) in one pair, improvement can be achieved in the drawback arising particularly when tilt in optical axis is increased that the areal ratio of one of reflective lateral face (c1) of an element to the other reflective lateral faces (a1, b1) as shown in FIG. 7(A) becomes great and the element's reflective efficiency drops. The fourth V-shaped groove set (w-lines) can traverse, for example referring to FIG. 7(A), other portions of the lateral faces a1 and b1 not contributing to retroreflection, without treversing the effective retroreflective regions (F1, F2). This enables to increase the effective areas of the element's reflective lateral faces, and hence to improve the drawback of drop in retroreflective efficiency with increased degree of tilt of the optical axis as demonstrated in FIG. 8.

Figure 11:
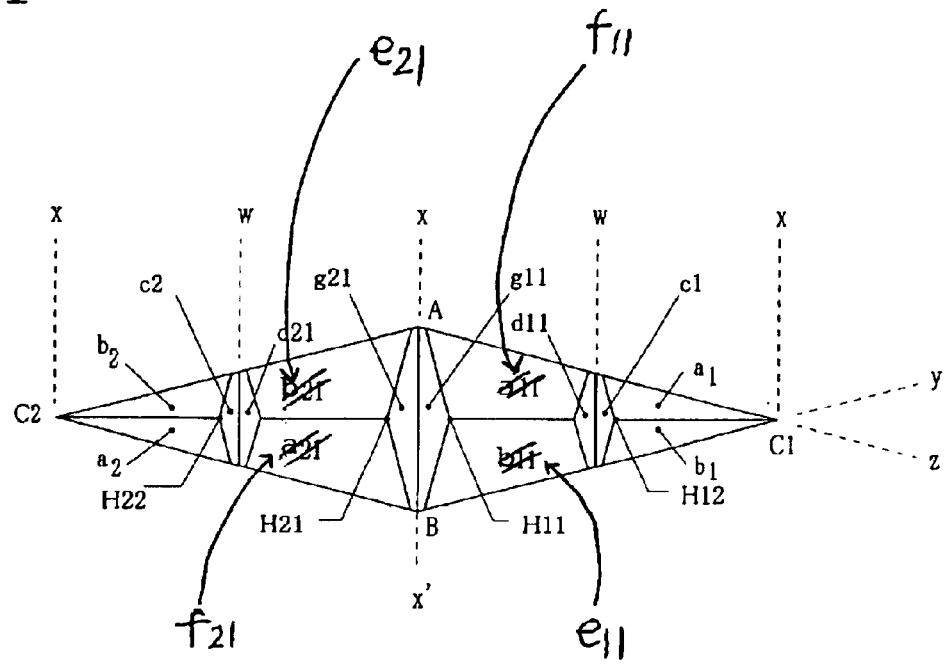
FIG. 11 shows a plan view and cross-sectional view of a complex cube-corner retroreflective element according to the present invention.
Figure 11:
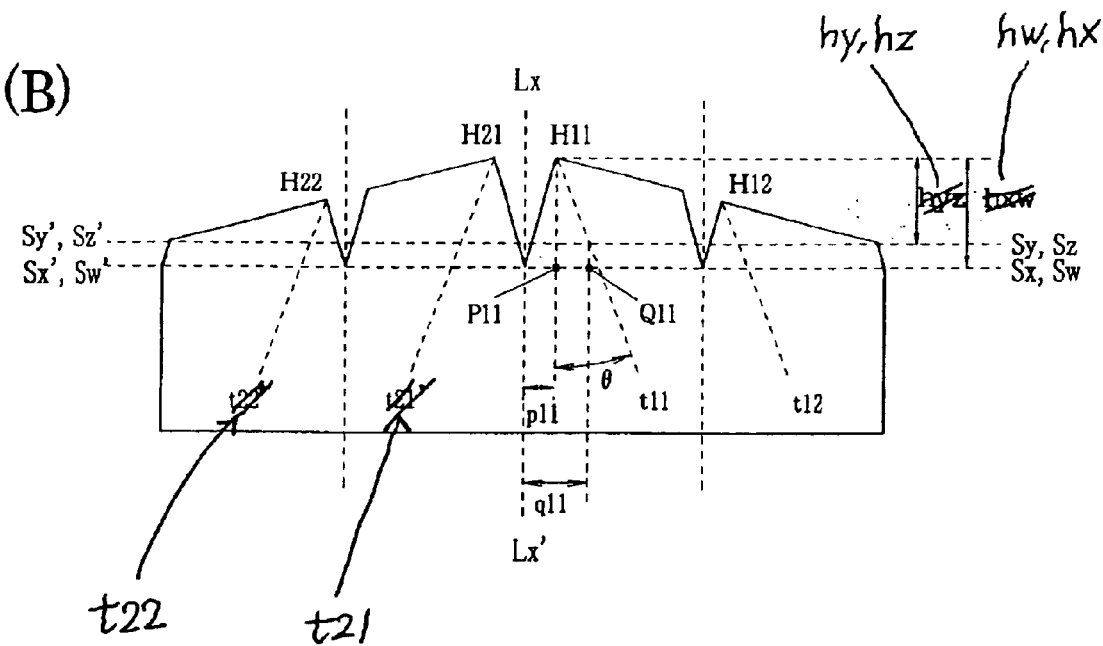

FIGS. 11(A) and 11(B) illustrate another embodiment of complex cube-corner retroreflective element.

FIGS. 11(A) and 11(B) show a complex cube-corner retroreflective element having a pair of triangular-pyramidal retroreflective units and a pair of tetrahedral retroreflective units, characterized in that the three reflective lateral faces (a1, b1, c1 and a2, b2, c2) of each of the pair of triangular-pyramidal retroreflective units form mutually perpendicular cube-corner reflective surfaces, respectively, the first reflective lateral faces (f11, f21), the second reflective lateral faces (e11, e21) and the third reflective lateral faces (g11, g21) of said pair of tetrahedral retroreflective units form a mutually perpendicular cube-corner reflective surfaces, respectively, said first reflective lateral faces (a1, a2) of the pair of triangular-pyramidal retroreflective units are on the same plane with the first lateral faces (f11, f21) of said tetrahedral retroreflective units, said second reflective lateral faces (b1, b2) of the triangular-pyramidal retroreflective units are on the same plane with the second lateral faces (e11, e21) of said tetrahedral retroreflective units, said complex cube-corner retroreflective element has a quadrangular circumference defined by mutually parallel y-lines and mutually parallel z-lines, said complex cube-corner retroreflective element has a substantially symmetrical V-shaped groove with its center line x-x' passing through the points of intersection of said parallel y-lines and parallel z-lines, the third reflective lateral face (c1) of said first triangular-pyramidal retroreflective unit is parallel to one (g11) of the two lateral faces forming said V-shaped groove, the third reflective lateral face (c2) of said second triangular-pyramidal retroreflective unit is parallel to the other (g21) of the two faces forming said V-shaped groove, and each one of the third reflective lateral faces (g11, g21) of said pair of tetrahedral retroreflective units is same to one of the two faces forming said V-shaped groove, respectively. Optical axes (t11, t12 and t21, t22) of this complex reflective element have a substantially same degree of tilt (q) in respect of the common base line (x), although differing in direction by 180° to each other.

FIG. 11(B) shows a complex reflective element in which, where the distance from an apex (H) to Sx plane determined by the x-line group is expressed as hx; the distance to Sy plane defined by the y-line group, as hy; the distance to Sz plane defined by the z-line group, as hz, and that to Sw plane defined by w-line group determined by base line of the fourth reflective lateral face of said tetrahedral retroreflective unit (d11 or d21), as hw, hx equals hw, hy equals hz, and the ratio of hx to hy is 1.05–1.5.

In the complex cube-corner retroreflective element according to the present invention, as illustrated in FIGS. 11(A) and 11(B), the V-shaped grooves providing the base line (x) and base line (w) are formed deeper than the other grooves providing the base lines (y,z) so that hx equals hw, hy equals hz and the ratio of hx to hy is 1.05–1.5. Hence, compared with such elements in which grooves having an identical depth are formed, areas of reflective lateral faces (g11, g21) and of reflective lateral faces (c1, c2) can be increased to achieve improvement in reflective efficiency.

Such embodiments with deeper grooves are particularly effective, when the optical axes are tilted in such directions, where the point of intersection of a perpendicular line drawn from apex (H) of the tetrahedral retroreflective unit having one of its base lines on x-x' line with Sx plane as defined by x-x' line group is represented by P and the point of intersection of the optical axis of same tetrahedral retroreflective unit with said Sx plane is represented by Q, the difference (q-p) between the distance (q) from x-x' line to point Q and the distance (p) from x-x' line to point P takes a positive (+) value (positive tilting).

It is preferred to deepen the V-shaped grooves formed by x-lines or w-lines to render hx greater than hy, so that the depth ratio, hx/hy, should fall within a range of 1.05–1.5, preferably 1.07–1.4.

In such elements wherein the difference (q-p) between the distance (q) from x-x' line to point Q and the distance (p) from x-x' line to point P takes a negative value, there appears an opposite tendency from those having positively tilted optical axes, that areas of the reflective lateral faces (g11, g21) and those (c1, c2) become excessively large as compared with those elements having grooves of an equal depth. Hence the areas of said reflective lateral faces (g11, g21) and reflective lateral faces (c1, c2) can be decreased by shallowing the V-shaped grooves which form the base line (x) and/or base line (w).

In such occasions, it is preferred to shallow the V-shaped grooves which are formed by x-lines and/or w-lines to make hx less than hy so that the depth ratio, hx/hy, in the elements with negatively tilted optical axes should fall within a range of 0.67–0.95, preferably 0.71–0.93.

Generally when a light beam passes through a fine aperture, the beam is diverged with an intensity inversely proportional to the area of said aperture, due to diffractive effect. The divergence improves visibility of reflected light to an observer (vehicle driver) present at a distant place from the light source (head lamp) (improvement in observation angularity).

Explaining the above referring to, for example, a known triangular-pyramidal retroreflective element as shown in FIG. 7(A), the aperture through which a light beam passes signifies the faces surrounded by three reflective lateral faces (a1, b1, c1 or a2, b2, c2) of the shown triangular-pyramids, respectively, (bases of the elements ABC1 and ABC2) whose area varies in proportion to height of the element. Where the element height is small, the aperture area decreases, and divergence of the reflected light enlarges due to increased diffraction effect. According to the calculation based on simulation on computer by ray-tracing method, with the element height of 50 mm or less, divergence of the reflected light rapidly increases. On the other hand, excessively small element dimensions results in excessive divergence of light and leads to decrease in retroreflection intensity in the front direction from which the light enters.

The complex cube-corner retroreflective element according to the present invention includes plural optical axes differing in height, and the cube-corner units each having one optical axis have aperture area differing from one another. This enables to enlarge divergence of reflected light by increased diffractive effect, without excessively reducing the element height, which leads to improvement in observation angularity compared with known element pairs containing a pair of optical axes.

Where the reflective element height (h) is less than 30 μm, the reflective element size becomes too small, and due to the diffraction effect which is decided by the aperture area of the reflective element, divergence of retroreflected light becomes excessive to reduce retroreflectivity. Whereas, any of the heights (h) of the element exceeding 400 μm is undesirable because it renders thickness of the sheeting too large to make a flexible sheeting.

Therefore, where a windable, flexible sheet-formed product is to be obtained according to the present invention, a cube-corner retroreflective sheeting having triangular-pyramidal reflective units, in which the distance (hx) from the Sx plane determined by the x-line group of the many complex cube-corner retroreflective elements to the apex (H1, H2) of one of the complex cube-corner retroreflective element pair is 30–400 μm, in particular, 50–200 μm, inter alia, 60–120 μm, is preferred.

Figure 12:
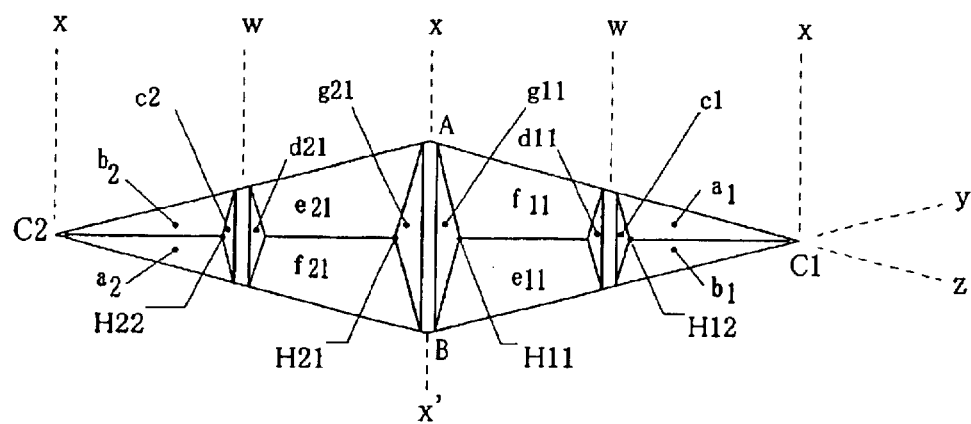
FIG. 12 shows a plan view and cross-sectional view of a complex cube-corner retroreflective element according to the present invention.
Figure 12:
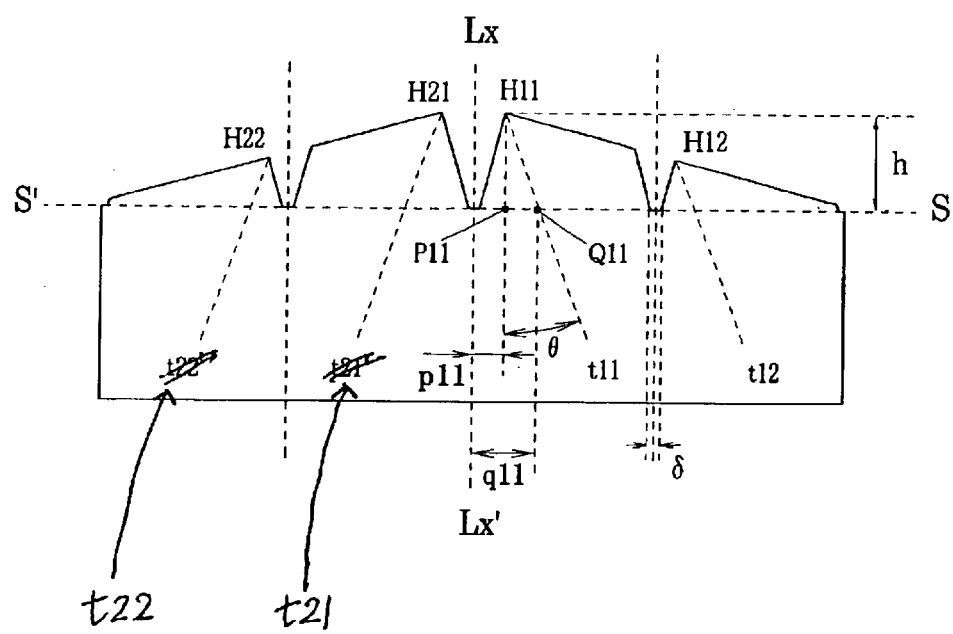

FIGS. 12(A) and 12(B) show a retroreflective device as described in any one of claims 1–11, which is characterized in that the bottoms of at least one of those substantially symmetrical V-shaped parallel groove groups (Vx, Vy, Vz and Vw) which are defined by said x-, y-, z- and w-line groups forming the triangular-pyramidal retroreflective units of tetrahedral retroreflective units are formed of a flat surface or a curved quadratic surface.

In FIG. 12(B), the base of at least one of the substantially symmetrical V-shaped parallel groove groups (Vx and Vw) which are defined by the x and w line groups is formed of a flat surface, and the width of the flat portion of the V-shape is δ.

The shape of the bottom of said V shape grooves may be flat or a curved quadratic surface.

In such a complex cube-corner retroreflective element, the cross-sectional shape of the V-shaped groove (Vx) forming the reflective lateral faces which face each other (g11, g21) and/or the cross sectional shape of the fourth V-shaped groove group (Vw) which cut off the lateral faces (a1, b1) is substantially symmetrical trapezoid, the width (δ) of the bottom of the grooves being preferably 3–20 μm. Where such complex cube-corner retroreflective element pairs constructed of the V-shaped grooves having said cross-sectional shapes are used, such an inconvenience occurring when tilt angle of optical axes is large, i.e., the bottom angles of the V-shaped grooves (Vx and Vw) become too small and invite insufficient strength of cutting tool or difficulty in parting the shaped resin product from inverted die having said shape, can be improved.

Where the point of intersection of a perpendicular line drawn from the apex (H) of the tetrahedral retroreflective unit having one of its base lines on x-x' line of a complex cube-corner retroreflective element of the present invention, with the Sx plane determined by x-x' line group is made P, and the point of intersection of the optical axis of said tetrahedral retroreflective unit with said Sx plane is made Q, the optical axis is tilted to such an extent that the distance (q) between x-x' line and said point Q and the distance (p) between x-x' line and the point P are not equal. As the reflective lateral faces (a1, a2) of the triangular-pyramidal retroreflective units are disposed on the same plane with the lateral faces (f11, f21) and the reflective lateral faces (c1, c2) are parallel to the faces (g11, g21) forming the V-shaped groove, respectively, tilt angles of the optical axes of the pair of triangular-pyramidal retroreflective elements are the same.

Preferably, where the point of intersection of a perpendicular line drawn from an apex (H) of one of the tetrahedral retroreflective units having one of its base lines of x-x' line with the Sx plane determined by x-x' line group is made P, and the point of intersection of the optical axis of said tetrahedral retroreflective unit with said Sx plane is made Q, the optical axes are tilted in the direction where the difference between the distance (q) from the x-x' line to the point Q and the distance (p) from the x-x' line to the point P, i.e., (q-p), takes a positive (+) value.

In particular, the optical axes are tilted by 0.5–30°, preferably 5–20°, in the direction, where the point of intersection of a perpendicular line drawn from an apex (H) of one of the tetrahedral retroreflective units having one base line on x-x' line with the Sx plane determined by x-x' line group is made P, and the point of intersection of the optical axis of said tetrahedral retroreflective unit with said Sx plane is made Q, that the difference between the distance (q) from the x-x' line to the point Q and the distance (p) from the x-x' line to the point P, i.e., (q-p), takes a positive (+) value.

With the view to improve observation angularity a deviation is given, to at least one of the two lateral faces of at least one group of the substantially symmetrical V-shaped parallel groove groups (Vx, Vy, Vz and Vw) which are determined by the x-, y-, z- and w-line groups of triangular-pyramidal retroreflective units or tetrahedral retroreflective unit(s), so that the prism angles of the triangular-pyramidal retroreflective units or of the tetrahedral retroreflective unit(s) which are formed by said V-shaped parallel grooves are given a deviation of ±(0.001–0.1)° from 90°.

Furthermore, with the view to impart a uniform observation angularity, it is most advantageous that at least one V-shaped parallel groove group among the substantially symmetrical V-shaped parallel groove groups (Vx, Vy, Vz and Vw) which are determined by the x-, y-, z- and w-line groups of the triangular-pyramidal retroreflective units or tetrahedral retroreflective unit(s), are given deviations such that the vertical angles of the cube-corner reflective elements formed by said group of V-shaped parallel grooves show deviations of ±(0.001–0.1)° from 90°, in a pattern of repeating at least two different sets of deviations.

As a means to deviate the vertical angles, in the occasion of cutting the groove groups in four directions (x, y, z and w) for forming the complex cube-corner retroreflective elements, angle of the V-shaped grooves in at least one direction is minutely and symmetrically deviated from the angle to give 90° to the prism angles. This means to impart the deviation can be accomplished by using a bilaterally symmetrical cutting tool.

As another means to impart a deviation to the vertical angles, in the occasion of cutting the V-shaped grooves in three directions (x, y, z and w) which form the complex cube-corner retroreflective elements, the V-shaped grooves in at least one direction can be cut at an angle minutely and bilaterally asymmetrically deviated from the angle to give 90° to the prismatic vertical angles. This means to impart the deviation can be accomplished by using a bilaterally asymmetrical cutting tool or by slightly canting a bilaterally symmetrical cutting tool at the time of cutting.

Figure 10:
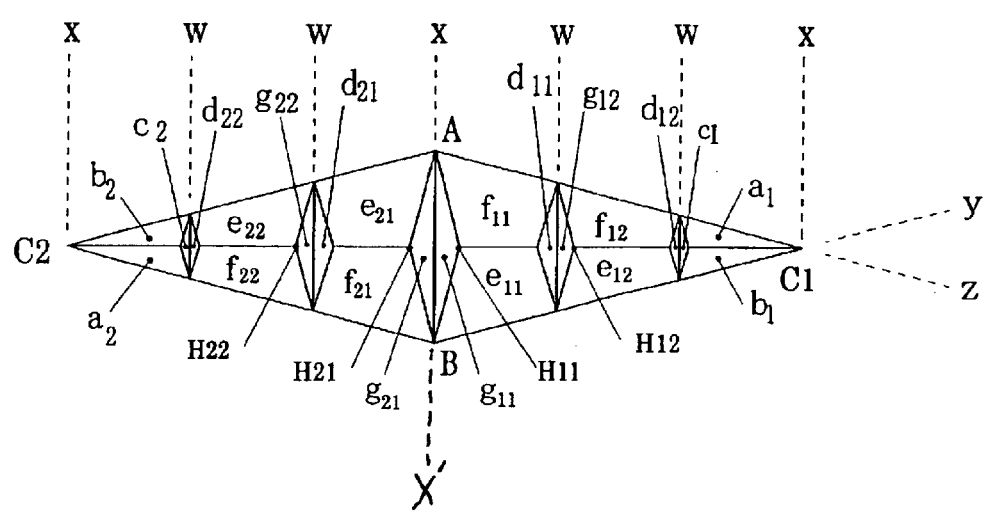
FIG. 10 shows a plan view and cross-sectional view of a complex cube-corner retroreflective element according to the present invention.
Figure 10:
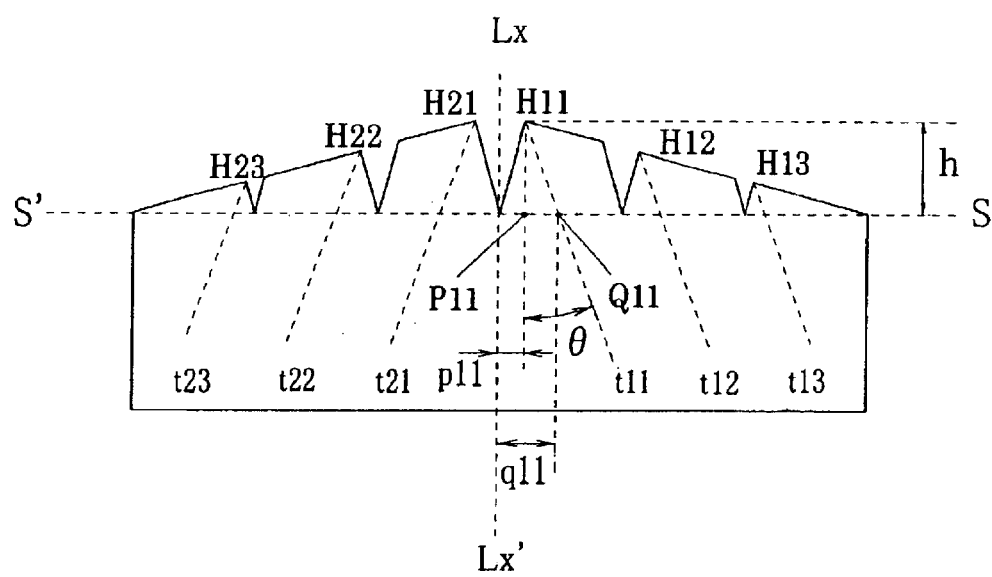

In the V-shaped parallel groove group (Vw) formed symmetrically in respect of w-lines, the face which forms a right angle with the prismatic vertical angle is only one of the lateral faces or side walls of the V-shaped groove (referring to FIG. 10, g12, c1 and g22, c2). Therefore, the cross-sectional configuration of the V-shaped groove is not necessarily symmetrical, but the other side wall not contributing to retroreflection (d12, d11 and d21, d22) can have an optional angle. Whereas, each adjacent complex reflective elements take bilaterally reversed configurations and cannot form cube-corner reflective faces. Therefore, the V-shaped grooves are preferably substantially symmetrical.

Where such retroreflective elements having deviated vertical angles are used, whereby retroreflected light does not return to the light source but retroreflect to a position slightly distant threfrom. Hence the light can be effectively directed, for example, to a vehicle driver (observer) present at a distant position from the vehicle's head lamps, and the observation angularity is improved. In particular, where V-shaped grooves are formed with a pattern of repeating at least two sets of deviations to deviate vertical angles of retroreflective elements, the retroreflective elements are given various deviations in their vertical angles to advantageously provide a uniform observation angularity.

FIGS. 13(A) and 13(B) show a complex cube-corner retroreflective element comprising a pair of triangular-pyramidal retroreflective units and three tetrahedral retroreflective units whose bases are difined by base lines in four directions, in which said pair of triangular-pyramidal retroreflective units have different sizes and are disposed at spaced positions and the three reflective lateral faces (e, f, g) of each of the tetrahedral retroreflective units are mutually perpendicular to form cube corners where they meet, said tetrahedral units being disposed between the pair of triangular-pyramidal retroreflective units, two being at the right side and one, at the left side.

Figure 13:
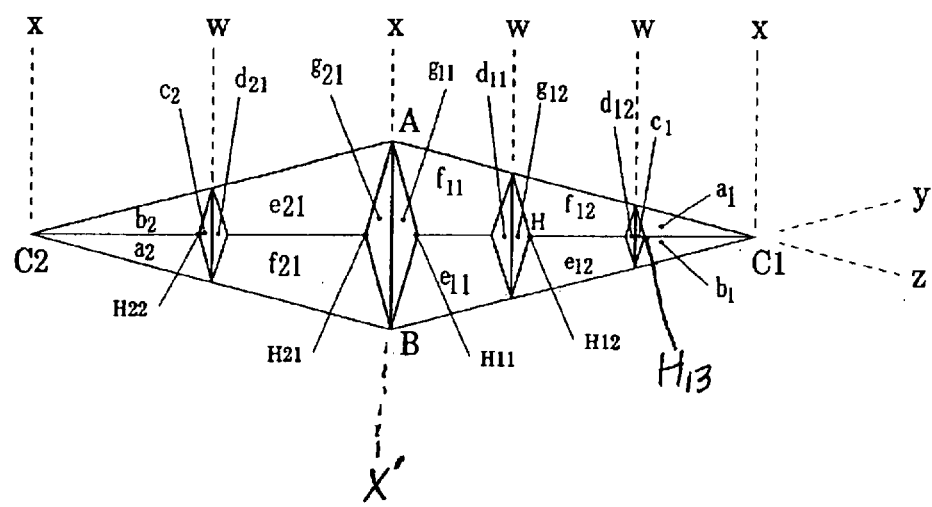
FIG. 13 shows a plan view and cross-sectional view of a complex cube-corner retroreflective element according to the present invention.
Figure 13:
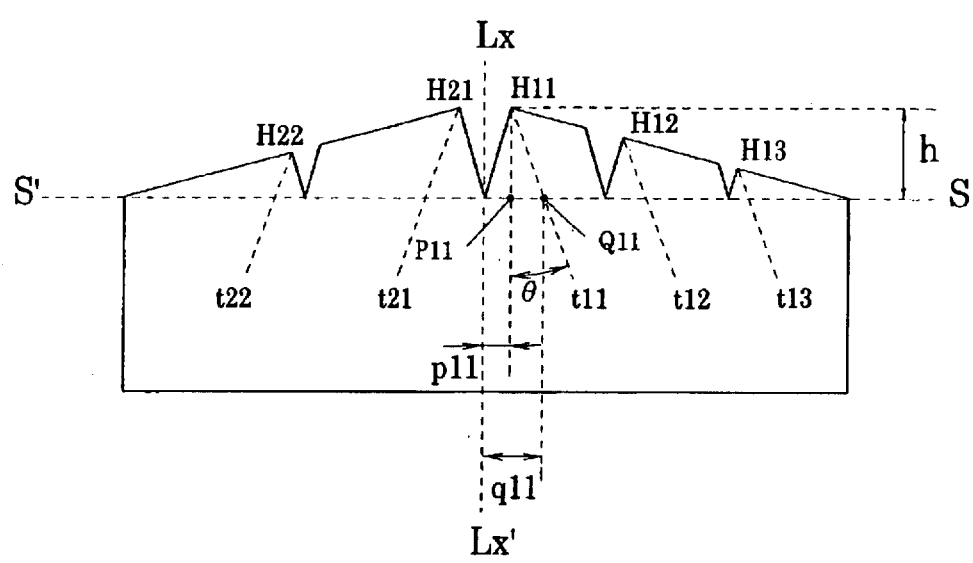
Figure 14:
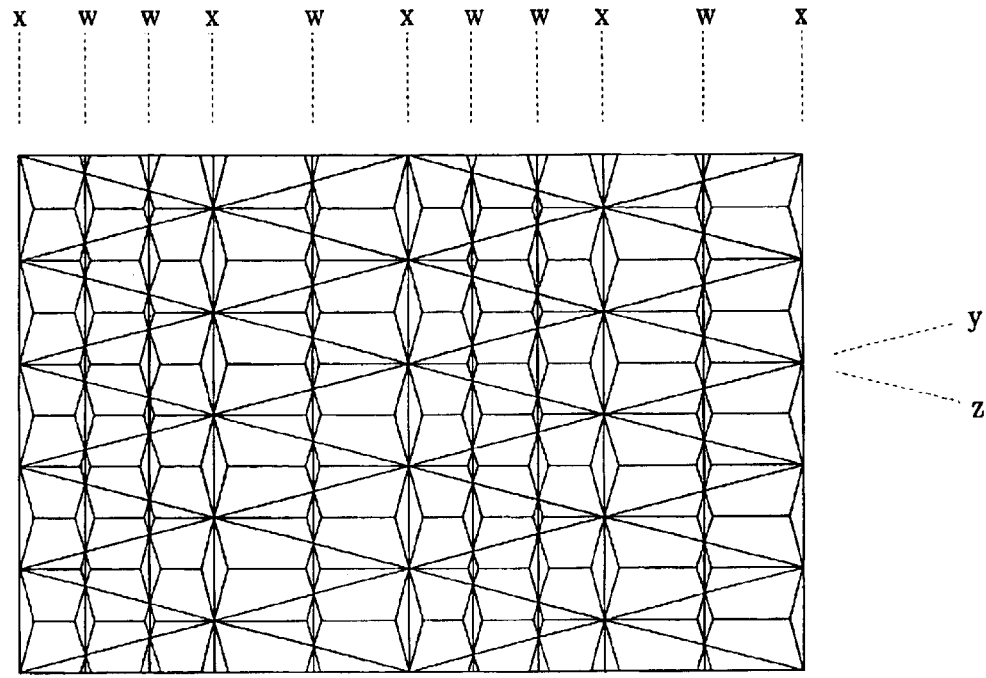
FIG. 14 is a plan view of a retroreflective device according to the present invention.

FIG. 14 shows a plan view of a retroreflective device in which a large number of the complex cube-corner retroreflective elements as shown in FIG. 13 are disposed in the closest-packed state. FIG. 14 shows a repeated pattern of forming x line group and w line group, in which one w line is formed between two parallel x lines and between the next two parallel x lines, two w-lines are formed.

Figure 15:
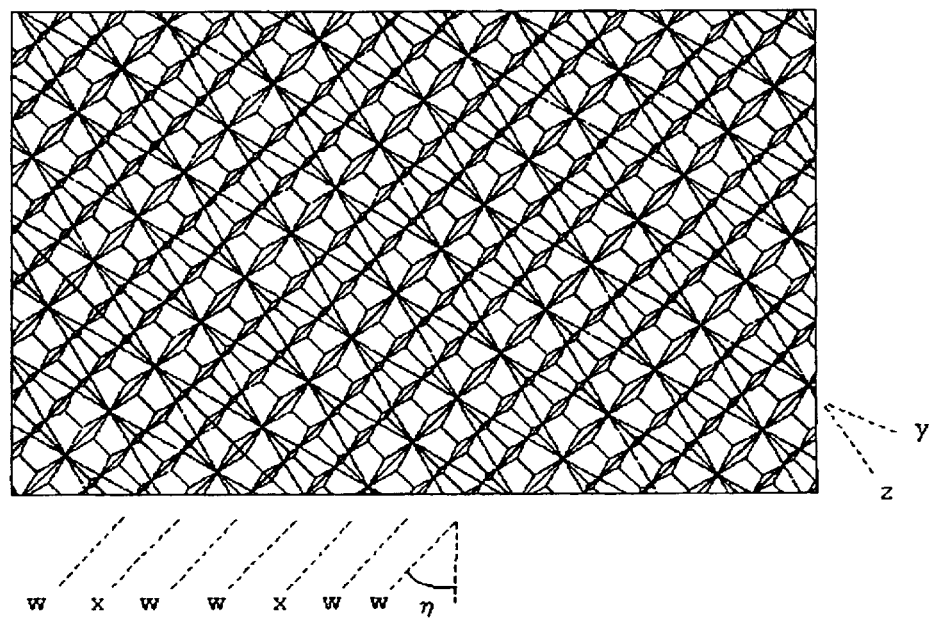
FIG. 15 is a plan view of a retroreflective device according to the present invention.

FIG. 15 shows a plan view of a retroreflective device in which the angle formed between the x lines of the device as illustrated above and an outer edge of a product formed of the retroreflective device is 5–85°, preferably 30–60°. Outer edge of the product as referred to herein signifies, where the product is a thin sheet-formed retroreflective sheeting, the longitudinal edge of a wound-up roll; or, where the product is an article like a thick-walled reflector, the edge in the horizontal direction may be the outer edge; or where the product has a circular shape, the standard edge may be the tangential line in the horizontal direction.

In such a retroreflective device in which the angle formed between x lines of the retroreflective device and the outer edge of the product formed from the retroreflective device is 5–85°, preferably 30–60°, entrance angularity can be further improved.

Figure 16:
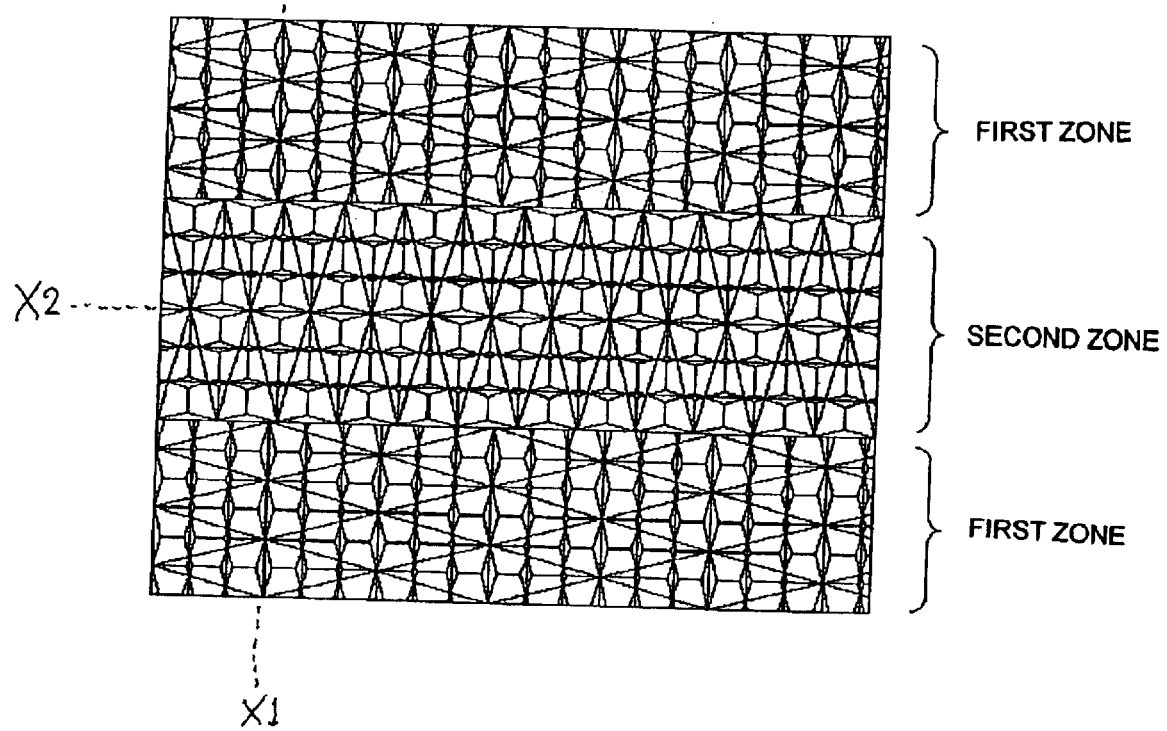
FIG. 16 is a plan view of a retroreflective device according to the present invention.

FIG. 16 shows a plan view of an example of retroreflective device which has first zone(s) and second zone(s), the angle formed between any x1 line of the first zone and x2 line in the second zone ranging 5–175°, preferably 80–100°. The two zones are combined in such a manner than the angle formed by x1 line of the first zone and the outer edge is 0° and the angle formed by x2 line of the second zone and the outer edge is 90°, which are disposed in repetitive pattern.

Figure 17:
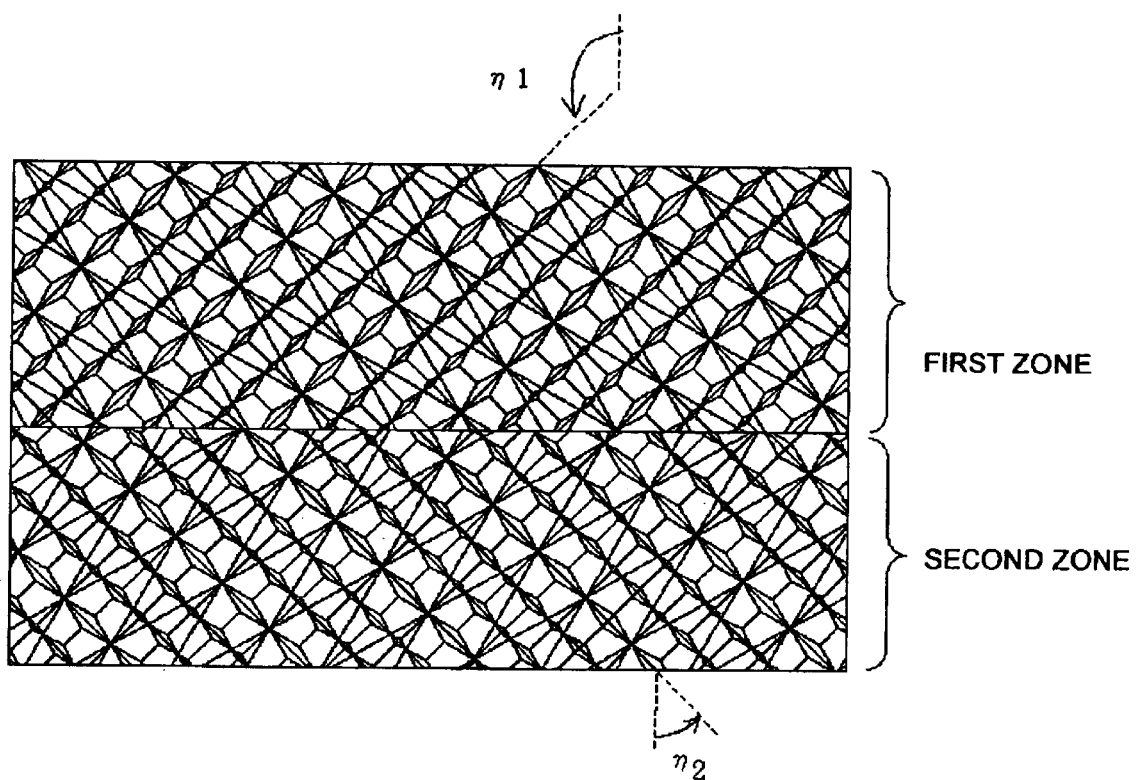
FIG. 17 is a plan view of a retroreflective device according to the present invention.

FIG. 17 shows a plan view of an example of a retroreflective device in which a first zone and second zone are combined in repeated pattern, in such a manner than the angle [η1] of the first zone formed with the outer edge is 135°, and the angle [η2] of the second zone with the outer edge is 45°.

Such a retroreflective device having first zone(s) and second zone(s), x1 line of the first zone and x2 line of the second zone form an angle of 5–175°, preferably 80–100°, can uniformize entrance angularity in horizontal and vertical directions and directions therebetween, by combining said zones.

Furthermore, the retroreflective device may have three or more zones, in which x-lines of each zone are selected to form divided angles with the outer edge so that the angles become uniform in all directions. By combining the zones in such a manner, entrance angularity in horizontal direction and perpendicular direction and directions therebetween can be still more uniformized.

The most favorable retroreflective device according to the present invention is a retroreflective device in which many complex cube-corner retroreflective elements, each comprising first and second triangular-pyramidal retroreflective units and at least a pair of tetrahedral retroreflective units, are disposed in the closest-packed state, said device being characterized in that all the tetrahedral retroreflective units have an identical shape and mutually form rotation symmetrical pair as rotated by 180° to one another, said complex cube-corner retroreflective elements have rotation-symmetrical shapes, where the point of intersection of a perpendicular line drawn from the apex (H) of the tetrahedral retroreflective unit having one base line on x-x' line with Sx plane determined by x-x' line group is made P and the point of intersection of the optical axis of said tetrahedral retroreflective unit with said Sx plane is made Q, the optical axis is tilted by 5–20° in the direction such that the difference between the distance (q) from x-x' line to the point Q and the distance (p) from x-x' line to the point P, i.e., (q-p), takes a positive (+) value, in the tetrahedral retroreflective unit having one of its base lines on said x-x' line, hx equals hw, hy equals hz, and the ratio of hx to hy is 1.05–1.5, and among the substantially symmetrical V-shaped parallel groove groups (Vx, Vy, Vz and Vw) determined by x-, y-, z- and w-line groups forming the triangular retroreflective units or the tetrahedral retroreflective units, at least one groove group have flat or quadratic bottoms.

In general, those complex cube-corner retroreflective sheetings and retroreflective articles of the present invention can be manufactured with cube-corner-molding dies, e.g., a metallic belt on which reversed female pattern of complex cube-corner retroreflective elements are arranged in closest-packed state as described in the foregoing is inscribed. By hot-pressing a pliable, adequate resin sheet excelling in optical transparency and uniformity as described later against such a molding die, the pattern inscribed on the die is transferred to the resin in reversed form, to provide a desired product.

A representative method for manufacturing above cube-corner molding die is described in detail, for example, in earlier cited U.S. Pat. No. 3,712,706 to Stamm. A method analogous to said method can be adopted also in this invention.

Specific explanation is given referring to the complex cube-corner elements as illustrated in FIGS. 9(A) to 13(B). On a substrate with a flatly ground surface, V-shaped parallel groove groups in two directions (e.g., in the directions of y lines and z lines in FIG. 9(A)), the groove groups having an identical depth (hy or hz) and substantially symmetrical cross-sectional shape, are cut, the repetition pitch in each direction, groove depth (e.g., h in FIG. 9(B), and mutual crossing angle of said grooves being determined according to the configuration of desired triangular-pyramidal reflective elements, with a super-hard cutting tool (e.g., diamond-tipped tool or tool made to tungsten carbide) having a point angle of around 47–86°.

Then another group of parallel, V-shaped grooves having a same depth (hx) and substantially symmetrical cross-section are so cut in the third direction (x-direction) as to pass the intersections (A, B, C1, C2) of the previously formed V-shaped grooves in y-direction and z-direction, using a similar super-hard cutting tool having a point angle of about 30–110°. Moreover, the fourth group of V-shaped grooves (w-direction) having a depth (hw) are cut in parallel with the V-shaped grooves in x-direction at such a repetition pitch as to divide each pitch between any two x grooves into an integral number of plural parts, with a super-hard cutting tool having a point angle similar to that of the tool used for cutting the V-shaped grooves in x-direction. In the present invention, depths of the grooves in x- and w-directions (hx, hw) may be the same with that of the grooves in y- and z-directions (hy or hz) or can be made deeper or shallower.

In a preferred embodiment of the present invention, where a windable, pliable sheet-formed product is intended, the V-shaped grooves in x-direction are so cut as to make the distance (h) between the plane (Sx-Sx') inclusive of the many base lines (x, x, . . . ) of the many complex cube-corner retroreflective elements projecting on the common base (Sx-Sx') and apices (H1, H2) of said complex cube-corner retroreflective element pair, 30–400 mm, in particular, 50–200 mm, inter alia, 60–120 μm. The depth of the V-shaped grooves in y- and z-directions may be same with that of the V-shaped grooves in x-direction, or may be made shallower to give the depth ratio hxhy or hx/hz to fall within a range of 1.05–1.5, preferably 1.07–1.4. The depth of the V-shaped grooves in w-direction may be the same to, or different from, that of the grooves in x-direction.

As the substrate suitable for making said microprismatic master mold, metallic materials having a Vickers hardness as defined by JIS Z 2244 of at least 350, in particular, at least 380, are preferred, specific examples including amorphous copper, electrodeposited nickel and aluminum; and as alloy materials, copper-zinc alloy (brass), copper-tin-zinc alloy, nickel-cobalt alloy, nickel-zinc alloy and aluminum alloy.

As the substrate, synthetic resins can also be used, which preferably are those having a glass transition point of at least 150° C., in particular, at least 200° C., and a Rockwell hardness (JIS Z 2245) of at least 70, in particular, at least 75, to avoid such inconvenience that a resin softens during the cutting process to make high precision cutting difficult. Specific examples of useful resins include polyethylene tetraphthalate resins, polybutylene phthalate resins, polycarbonate resins, polymethyl methacrylate resins, polyimide resins, polyarylate resins, polyether sulfon resins, polyether imide resins and cellulose triacetate resins.

Thus obtained microprismatic master mold is given an electroforming processing to form a metallic coating on its surface. Upon removing the metallic coating from the master mold surface, a metallic die to be used for molding a complex cube-corner retroreflective sheeting or device of the present invention is provided.

In general, said electroforming is conducted, for example, in 60 wt % aqueous solution of nickel sulfamate, under such conditions as around 40° C. and 10 A/dm$^2$ electric current. As the formation rate of electroformed layer, for example, one not faster than about 0.02 mm/hr is suitable for providing a uniform electroformed layer. At a formation rate greater than that, troubles such as lack in surface smoothness or formation of defective part in the electroformed layer are apt to be caused.

The first generation electroformed die made from the prismatic master mold can be repetitively used as an electroformed master die for making second generation electroformed dies. Therefore, plural electroformed dies can be made from one prismatic master mold.

Thus manufactured plural electroformed dies are precisely cut, and can be assembled and bonded to a final die size for molding microprismatic sheeting of synthetic resin. As a means for the bonding, cut end surfaces may be simply pressed against each other, or the joining parts of an assembly may be welded by such means as electron beam welding, YAG laser welding, carbon dioxide gas laser welding, and the like.

The assembled electroformed die is used for molding synthetic resin, as a synthetic resin-molding die. As the means for molding synthetic resin, compression molding or injection molding can be adopted.

Compression molding comprises, for example, inserting a thin-walled nickel electroformed die prepared as above, synthetic resin sheet of a prescribed thickness and a silicone rubber sheet of approximately 5 mm in thickness as a cushioning material into a compression molding press which has been heated to a prescribed temperature; preheating the inserted materials under a pressure of 10–20% that of the prescribed molding pressure for 30 seconds; and heating and pressurizing said materials under such conditions as around 180–250° C. ad 10–30 kg/cm$^2$, for about 2 minutes. Thereafter the press is cooled to room temperature while maintaining the pressurized condition, and then the pressure is released to provide a prismatic molded product.

The injection molded can be conducted using a thick-walled electroformed nickel die which was formed by the above-described method as an injection molding die according to accepted practice, and a customarily used injection molding machine. In that occasion, an injection molding method wherein a mobile die and fixed die are kept under pressure during pouring molten resin into the dies, or an injection compression method can be adopted wherein the mobile die and fixed die are not given a pressure and the molten resin is poured through a minor aperture opened and thereafter the system is pressurized. These methods are suitable particularly for making thick-walled products, e.g., a pavement marker.

Moreover, about 0.5 mm-thick thin-walled electroformed dies made by the above method can be bonded by aforementioned welding method to form an endless belt die, which is mounted on a pair of a heating roll and a cooling roll and rotated. Onto the belt die on the heating roll, molten synthetic resin is supplied in sheet form, pressure molded with at least one silicone roll, cooled on the cooling roll to a temperature not higher than the glass transition point, and stripped off from the belt die. Thus a continuous sheet-formed product can be obtained.

Figure 18:
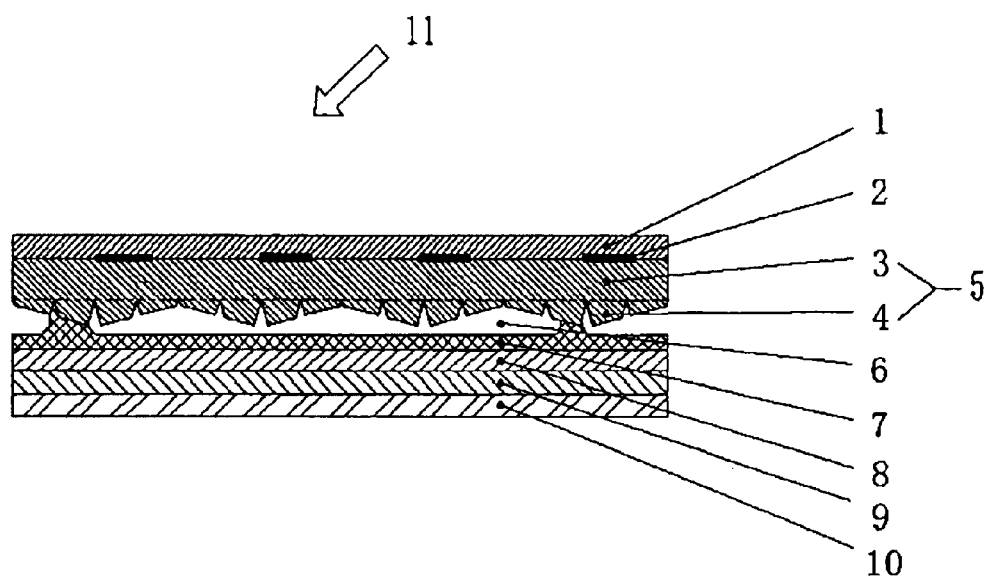
FIG. 18 shows cross-sectional construction of a retroreflective device of the present invention.

Now an embodiment of a structure of preferred cube-corner retroreflective sheeting and retroreflective device of the present invention shall be explained, referring to their cross-sectional view shown in FIG. 18.

In FIG. 18, the numeral 4 is a reflective element layer in which the complex cube-corner retroreflective elements (R1, R2) of the present invention are disposed in closest packed state; 3 is a holder layer which holds the reflective elements; and the arrow 11 shows the direction of incident light. Normally the reflective element layer (4) and the holder layer (3) form an integral body (5), but they may be a laminate of two different layers. Depending on the intended use of a retroreflective sheeting or a retroreflective article of the present invention and the circumstances under which they are used, a surface protective layer (1), print layer (2) to convey information to a viewer or to impact color to the sheeting, binder layer (7) to provide an airtightly sealed structure to prevent infiltration of water to the back of the reflective element layer, support layer (8) to support the binder layer (7); and an adhesive layer (9) with a peeling layer (10) for adhering the retroreflective sheeting or the retroreflective article to another structure, can be provided.

The print layer (2) can be installed normally between the surface protective layer (1) and the holder layer (3) or on the surface protective layer (1) or the reflection surface of the reflective element layer (4) by such ordinary means as gravure, screen printing, or ink-jet printing.

While the material for making said reflective element layer (4) and holder layer (3) is not critical so long as it satisfies pliability which is one of the objects to be achieved by the present invention, one having optical transparency and homogeneity is preferred. Examples of the material useful for the invention include polycarbonate resin, vinyl chloride resin, (meth)acrylic resin, epoxy resin, polystyrene resin, polyester resin, fluorine-contained resin, polyolefin resin such as polyethylene resin or polypropylene resin, cellulose resin, and polyurethane resin. Furthermore, with the view to improve weatherability, ultraviolet absorber, photostabilizer, antioxidant and the like can be used either singly or in combination. Any of various organic pigments, inorganic pigments, fluorescent pigments, dyes, fluorescent dyes as colorant may also be contained.

For the surface protective layer (1), the same resin as used for the retroreflective element layer (4) can be used, which may be incorporated with ultraviolet absorber, photostabilizer, antioxidant and the like which can be used either singly or in combination. Still in addition, various organic pigments, inorganic pigments, fluorescent pigments, dyes, fluorescent dyes and the like as colorant may be incorporated.

It is a general practice with the reflective element layer (4) of the present invention, to provide an air layer (6) behind the complex cube-corner retroreflective elements, for enlarging the critical angle satisfying the total internal reflection conditions. To prevent such troubles under conditions of use as decrease in critical angle, corrosion of metallic layer or the like due to infiltrated moisture, the reflective element layer (4) and the support layer (8) are airtightly sealed by a binder layer (7).

As means for this airtight sealing, those described in U.S. Pat. Nos. 3,190,178 and 4,025,159 and JP-Utility Model Showa 50 (1975)-28669A can be used. As the resin to be used for the binder layer (7), (meth)acrylic resin, polyester resin, alkyd resin, epoxy resin and the like can be named, and as the bonding means, known thermofusing resin binding method, thermosetting resin binding method, ultraviolet curable resin binding method, electron beam curable resin binding method and the like can be suitably adopted.

The binding layer (7) used in the present invention may be applied over the entire surface of the support layer (8), or can be selectively provided at the bonding portion(s) with the retroreflective element layer, by such means as printing method.

Examples of the material for constituting the support layer (8) include resins for making the retroreflective element layer, film-forming resins in general, fibers, fabric, metallic foil or plate such as of stainless steel or aluminum, which can be used either singly or in combination.

The adhesive layer (9) used for adhering the retroreflective sheeting or retroreflective article of the present invention onto metallic plate, wood board, glass sheet, plastic sheet and the like, and the peeling layer (10) for the adhesive can be suitably selected from known materials. The adhesive can be suitably selected among pressure-sensitive adhesives, heat-sensitive adhesives, crosslinkable adhesives and the like. Examples of pressure-sensitive adhesive include polyacrylate agglutinants obtained by copolymerizing acrylic acid esters such as butyl acrylate, 2-ethylhexyl acrylate, isooctyl acrylate, nonyl acrylate and the like, with acrylic acid, vinyl acetate and the like; silicone resin agglutinants; and rubber agglutinants. As heat-sensitive adhesives, acrylic, polyester or epoxy resins can be used.

Figure 19:
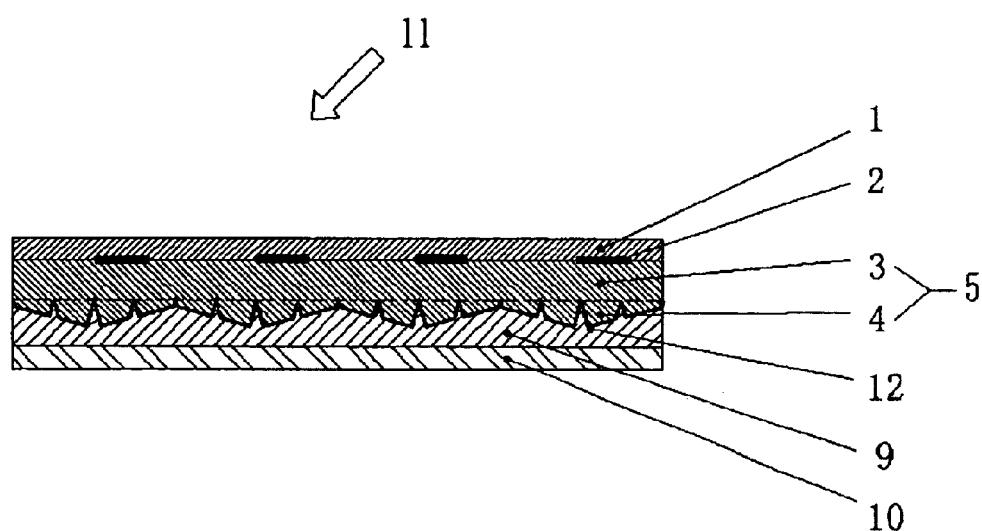
FIG. 19 shows cross-sectional construction of a retroreflective device of the present invention.

Now another embodiment of a preferred structure of the cube-corner retroreflective sheeting or retroreflective article of the present invention is explained referring to FIG. 19 which is a cross-sectional view of the embodiment.

In FIG. 19, a metallic specular reflective layer (12) is provided on the surfaces of the elements in the reflective element layer (4), and an adhesive layer and a peeling layer are laminated on, and in direct contact with, the specular reflection layer (12). The cube-corner retroreflective sheeting or retroreflective article of this embodiment do not require an air layer because they retroreflect on principle of specular reflection, and hence do not require any binder layer or support layer. The metallic specular reflection layer (12) installed on the element surfaces in the reflective element layer (4) of the present invention may cover the entire region of the element surfaces or cover it only partially.

The specular reflection layer (12) formed of a metal such as aluminum, copper, silver, nickel or the like can be provided on the elements in the reflective element layer (4) of the complex cube-corner retroreflective sheeting or retroreflective device of the present invention by such means as vacuum vapor deposition, chemical plating or sputtering. Of these means for providing said specular reflective layer (12), vapor deposition means using aluminum is preferred, because the vapor deposition temperature can be lowered to minimize thermal deformation of the retroreflective elements during the vapor deposition step, and also the resulting specular reflective layer (12) shows the fairest color tone.

An apparatus suitable for continuous vapor deposition of aluminum specular reflection layer (12) comprises a vacuum vessel which is capable of maintaining a degree of vacuum at around 7 to $9 \times 10^{-4}$ mm Hg, said vacuum vessel accommodating therein a feeder for feeding an original prism sheeting formed of a base sheet and a surface protective layer which is laminated on the light entrance side surface of said base sheet; a take-up winder for winding up the original prism sheeting which has been vacuum-deposition treated; and a heating system installed therebetween which is capable of fusing the aluminum in a graphite crucible with an electric heater. Pure aluminum pellets having a purity of at least 99.99 wt % are put in the graphite crucible, melted and vaporized under the conditions, e.g., an AC voltage of 350–360 V, an electric current of 115–120 A and a treating rate of 30–70 m/min. With the vaporized aluminum atoms, a specular reflection layer (12) can be deposited on the surfaces of retroreflective elements at a thickness of, for example, 800–2000 Å.

Hereinafter the particulars of the present invention are explained more specifically, referring to working Examples, it being understood that the invention is not limited to the Examples only.

<Coefficient of retroreflection>

Coefficient of retroreflection referred to in the specification, in particular, in Examples, was measured by the following method. Using a reflectometer "Model 920" of Gamma-Scientific Co., coefficients of retroreflection of each 100 mm×100 mm retroreflective sheeting were measured following ASTM E810-91 at optional five spots, under the angular conditions of: observation angle, 0.2°; and incident angles, 5°, 10°, 20°, 30°, 40° and 50°. The mean values of the measured values are indicated as the coefficients of retroreflection of the measured retroreflective sheeting. Also for comparison of observation angularity, coefficients of retroreflection at an incident angle of 5° and observation angle of 1.0° were measured.

EXAMPLE 1

Figure 1:
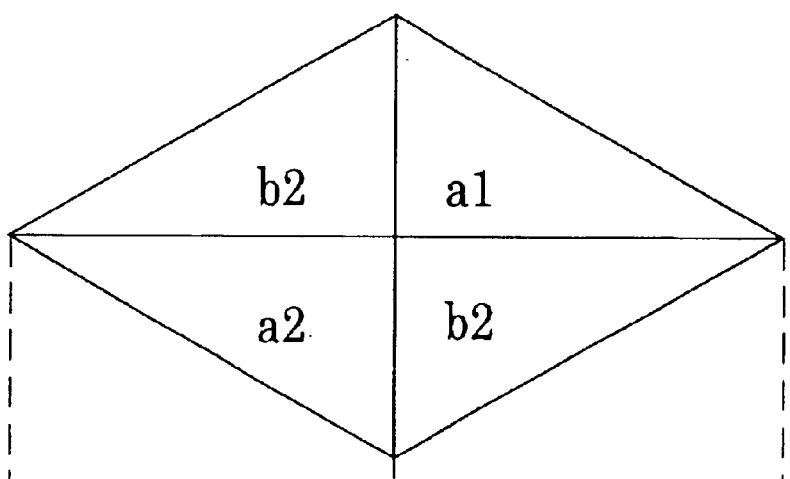
FIG. 1 shows a plan view and cross-sectional view illustrating cutting procedure of a retroreflective element pair by a conventional technology.
Figure 1:
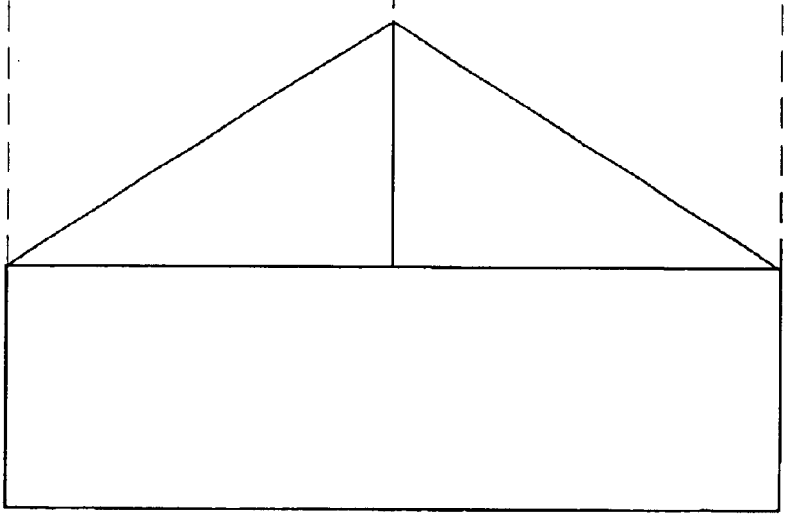
Figure 2:
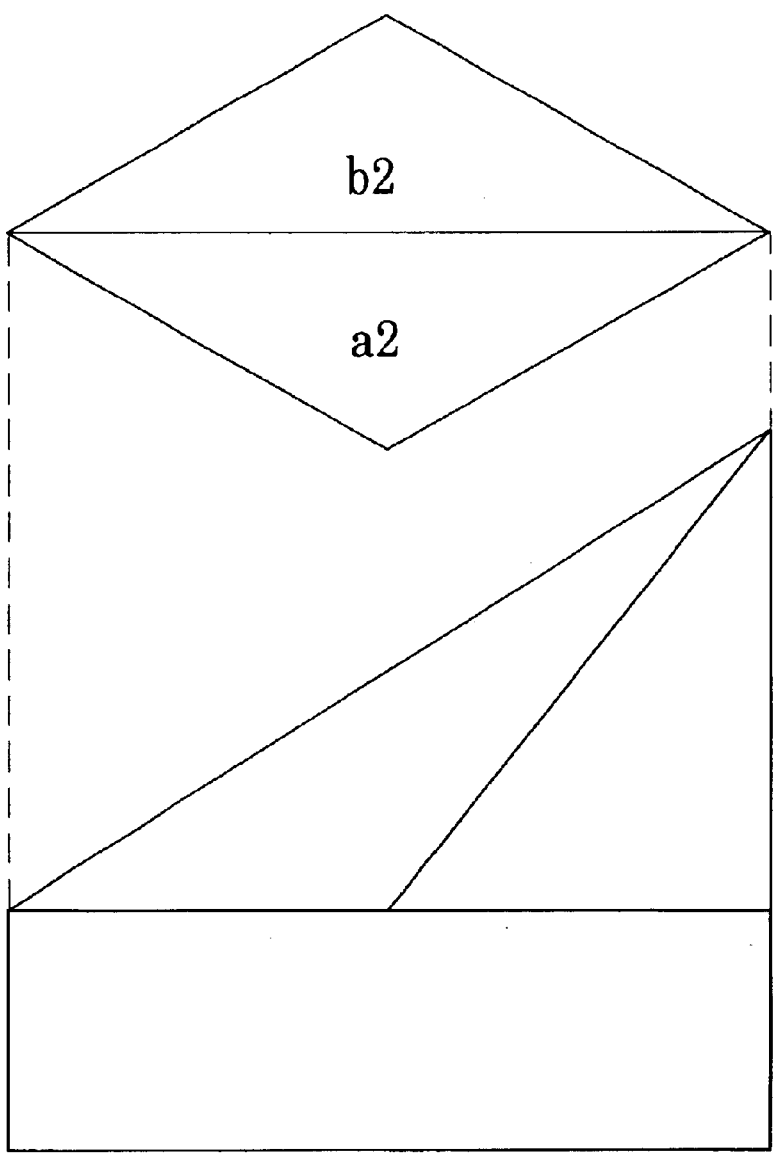
FIG. 2 shows a plan view and cross-sectional view illustrating cutting procedure of a retroreflective element pair by a conventional technology.

A large number of parallel V-formed groove groups of symmetrical cross-sections were cut in y-direction and z-direction in a repetitive pattern by fly cutting method, on a 100 mm square brass plate with a flatly ground surface, with a diamond-tipped cutting tool having a point angle of 83.11°. The repetition pitch of V-shaped grooves in y-direction and z-direction was 201.45 μm, the groove depth was 100.00 μm, and crossing angle of the V-shaped grooves in y-direction with those in z-direction was 38.207°. An intermediate configuration as shown in FIG. 1 was formed.

Figure 3:
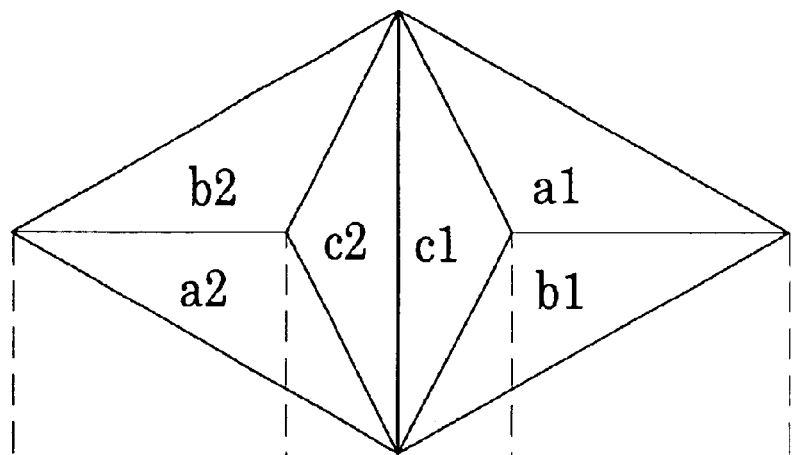
FIG. 3 shows a plan view and cross-sectional view of a retroreflective element pair according to a conventional technology.
Figure 3:
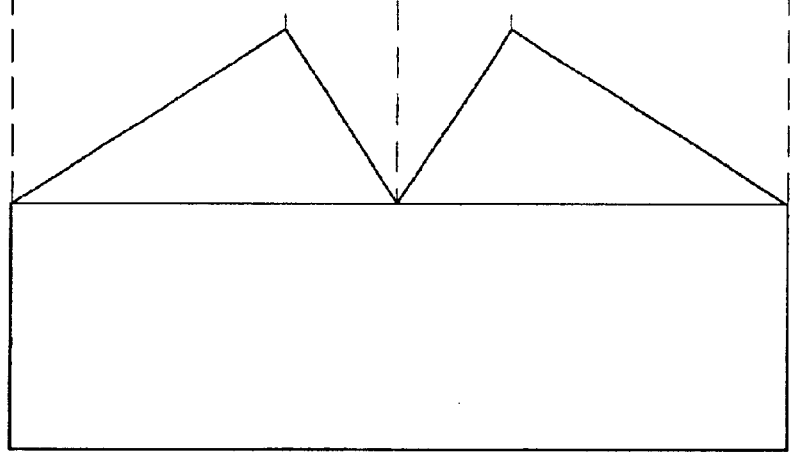
Figure 4:
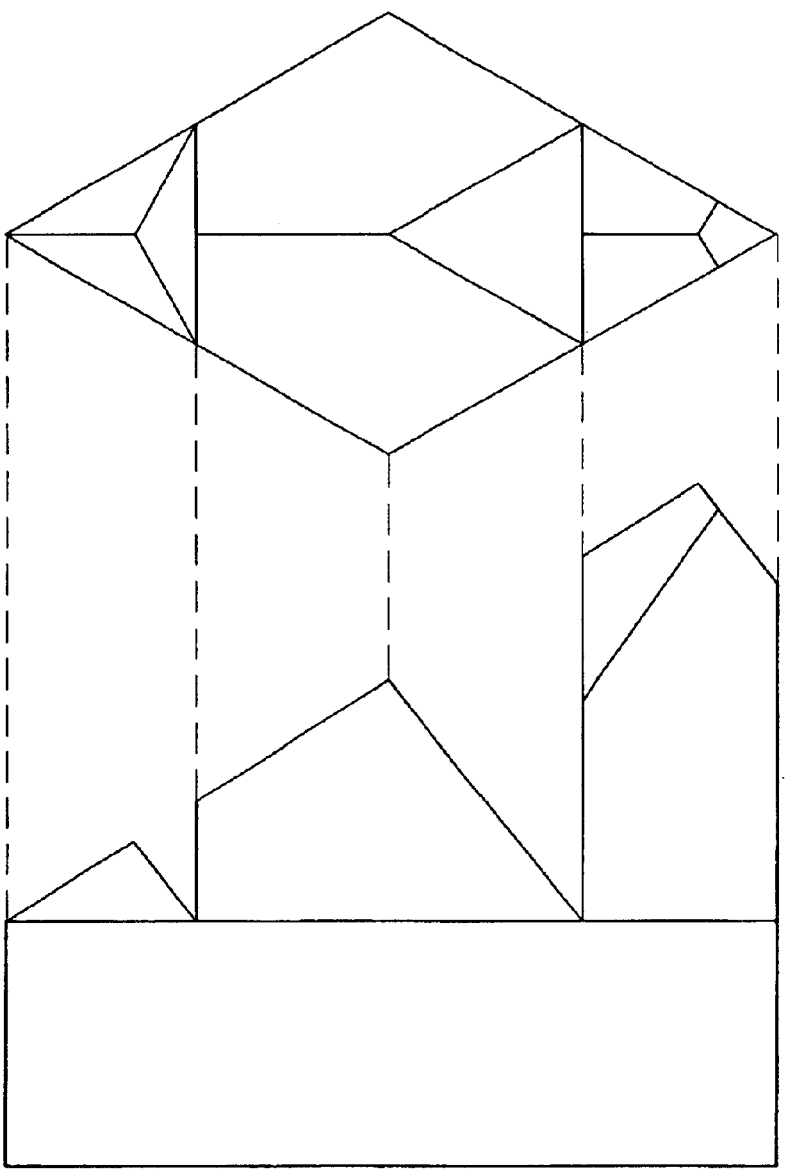
FIG. 4 shows a plan view and cross-sectional view of a retroreflective element pair according to a conventional technology.
Figure 5:
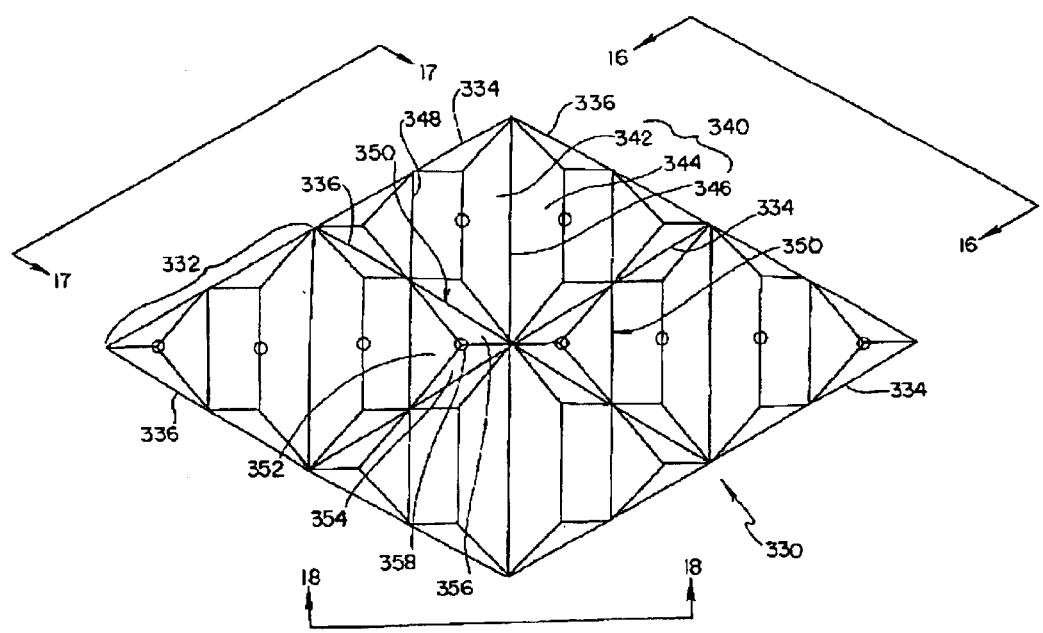
FIG. 5 is a plan view of retroreflective elements according to a conventional technology.
Figure 6:
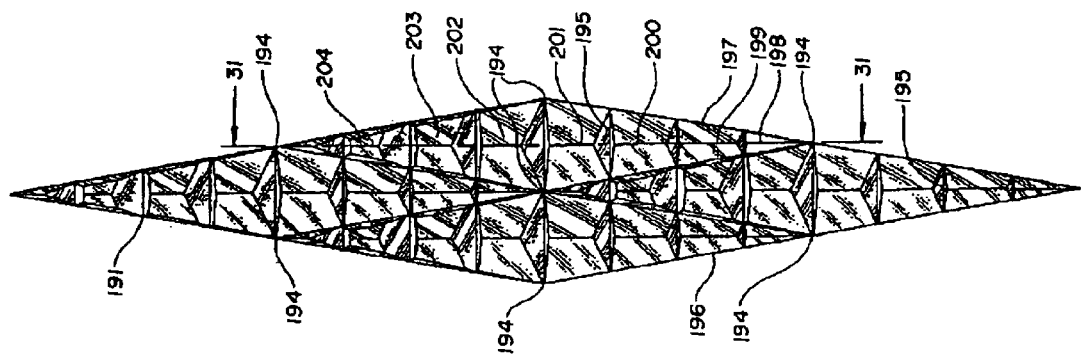
FIG. 6 is a plan view of retroreflective elements according to a conventional technology.

Furthermore, another group of parallel V-shaped grooves were cut in the x-direction in repetitive pattern with a diamond-tipped cutting tool having a symmetrical cross-section and point angle of 40.53°, at a repetition pitch of said V-shaped grooves of 307.77 μm and to the V-shaped groove depth of 100.00 μm, each of said grooves passing through two points of intersection of the y-directioned grooves and z-directioned grooves, to form on said brass plate many male triangular-pyramidal cube-corner elements arranged in closest-packed state, each element taking an intermediate configuration as illustrated in FIG. 3.

Thereafter still another group of parallel V-shaped grooves were cut in a repetitive pattern in the w-direction with a diamond-tipped cutting tool having a symmetrical cross-section and a point angle of 40.53°, at a repetition pitch of said V-shaped grooves of 307.77 μm and to the V-shaped groove depth of 100.00 μm, each of said grooves passing through the center point of two adjacent V-formed grooves in x-direction. Thus on the brass plate a master mold according to the present invention, formed of a large number of male complex cube-corner retroreflective elements which were disposed in the closest-packed state on said plate, was prepared. This master mold was formed of an array of the element as illustrated in FIG. 10 (A), and the number of V-shaped groove in w-direction between two V-shaped grooves in x-direction was one.

In so formed complex cube-corner retroreflective element pair, the height (h) from the apex (H11 or H21) to the base plane (S-S') was 100 μm. The tilt angle (θ) of each optical axis of this complex cube-corner retroreflective element was +15°, and the vertical angles of the three lateral faces constituting the reflective element were invariably 90°.

The cutting parameters used to make the master mold of Example 1 are listed in the following:

depth of V-shaped grooves in x-, y-, z- and w-directions: 100.00 μm angle of V-shaped grooves in y- and z-directions: 83.11° angle of V-shaped grooves in x- and w-directions: 40.53° pitch of V-shaped grooves in y- and z-directions: 201.46 μm pitch of V-shaped grooves in x- and w-directions: 307.77 μm crossing angle of y-directioned V grooves with z-directioned V grooves: 38.21° crossing angle of y- and z-directioned V grooves with x-directioned V grooves: 70.90° tilt angle of optical axes: 15°

Using this brass master mold, a female cube-corner forming die with reversed configuration made of nickel was prepared by electroforming method using a nickel sulfamate solution of 55% in concentration. Compression molding a 200 μm-thick polycarbonate resin sheet (Iupilon ™H3000, Mitsubishi Engineering Plastics K.K.) using this molding die, under the conditions of molding temperature of 200° C. and molding pressure of 50 kg/cm², the resin sheet was cooled to 30° C. under the elevated pressure and withdrawn. Thus a retroreflective device with about 150° μm-thick holder layer (3) on whose surface a large number of polycarbonate resin complex cube-corner retroreflective elements of the element layer (4) were disposed in closest packed state was prepared.

EXAMPLE 2

A polycarbonate resin retroreflective device in which a large number of the complex cube-corner retroreflective elements as illustrated in FIGS. 11(A) and 11(B) were disposed in closest-packed state was prepared by the same method as described in Example 1, except that the depth of V-shaped grooves in x- and w-directions was made 115.00 μm.

The cutting parameters used to make the master mold of Example 2 are listed in the following:

depth of V-shaped grooves in y and z-directions: 100.00 μm depth of V-shaped grooves in x- and w-directions: 115.00 μm angle of V-shaped grooves in y- and z-directions: 83.11° angle of V-shaped grooves in x- and w-directions: 40.53° pitch of V-shaped grooves in y- and z-directions: 201.46 μm pitch of V-shaped grooves in x- and w-directions: 307.77 μm crossing angle of y-directioned V grooves with z-directioned V grooves: 38.21° crossing angle of y- and z-directioned V grooves with x-directioned V grooves: 70.90° tilt angle of optical axes: 15°

EXAMPLE 3

A polycarbonate resin retroreflective device in which a large number of the complex cube-corner retroreflective elements as illustrated in FIGS. 12(A) and 12(B) were disposed in closest-packed state was prepared by the same method as described in Example 1, except that the point of the diamond-tipped tool used for cutting V-shaped grooves of x- and w-directions was advancedly lapped to have a width (dw) of 8 μm.

The cutting parameters used to make the master mold of Example 3 are listed in the following:

depth of V-shaped grooves in x-, y-, z- and w-directions: 100.00 μm angle of V-shaped grooves in y- and z-directions: 83.11° angle of V-shaped grooves in x- and w-directions: 40.53° pitch of V-shaped grooves in y- and z-directions: 201.46 μm pitch of V-shaped grooves in x- and w-directions: 307.77 μm crossing angle of y-directioned V grooves with z-directioned V grooves: 38.21° crossing angle of y- and z-directioned V grooves with x-directioned V grooves: 70.90° width of bottom portion of each of V-shaped grooves in x- and w-directions: 8 μm tilt angle of optical axes: 15°

EXAMPLE 4

In the production of the elements according to Example 2, three kinds of diamond-tipped tools A, B and C for cutting V-shaped grooves in x- and w-directions were prepared, whose V-angles were varied as follows: the angle of tool A was same with that used in said Example, a deviation of +0.01° was given to one of the lateral faces forming the V shape of tool B, and a deviation of −0.01° was given to one of the lateral faces forming the V-shaped of tool C. Using these three kinds of cutting tools, V-shaped grooves in x- and w-directions were cut in a repetitive pattern of A-B-C, to form a master mold in which a larger number of complex cube-corner retroreflective elements with varied deviations given to their vertical angles were disposed in closest-packed state. Using this master mold a polycarbonate resin retroreflective device in which a large number of complex cube-corner retroreflective elements were disposed in closest-packed state was prepared by the method as described in Example 1.

EXAMPLE 5

A polycarbonate resin retroreflective device which was given an azimuth so that the x-lines of said retroreflective device each formed an angle of 45° with the outer edge thereof, using the polycarbonate resin complex cube-corner retroreflective device as prepared in Example 2.

EXAMPLE 6

An article formed of plural polycarbonate resin complex cube-corner retroreflective devices was prepared using the polycarbonate complex cube-corner retroreflective devices as prepared in Example 2. Said devices were repeatedly joined in such an arrangement that the first zone device in which its x-lines each formed an angle of 45° with the outer edge of the final product and the second zone device in which its x-lines each formed an angle of 135° with the outer edge of the final product appeared alternatively to form a 10-mm wide striped pattern.

COMPARATIVE EXAMPLE

A polycarbonate resin retroreflective device in which a large number of complex cube-corner retroreflective elements as illustrated in FIG. 3 were disposed in closest-packed state was prepared by the same method as in Example 1, except that V-shaped grooves in x-, y- and z-directions were cut but V-shaped grooves in w-direction were not cut.

The cutting parameters used to make the master mold of the Comparative Example are listed in the following:

depth of V-shaped grooves in x-, y- and z-directions: 100.00 μm angle of V-shaped grooves in y- and z-directions: 83.11° angle of V-shaped grooves in x-direction: 40.53° pitch of V-shaped grooves in y- and z-directions: 201.46 μm pitch of V-shaped grooves in x-direction: 307.77 μm crossing angle of y-directioned V grooves with z-directional V grooves: 38.21° crossing angle of y- and z-directioned V grooves with x-directioned V grooves: 70.90° tilt angle of optical axes: 15°

Coefficients of retroreflection of those retroreflective devices as prepared in above Examples 1–6, in which the complex cube-corner retroreflective elements were disposed in closest-packed state, and the coefficients of retroreflection of the triangular-pyramidal cube-corner retroreflective sheeting as prepared in Comparative Example are shown in Table 1. The coefficients of retroreflection of those retroreflective devices of Examples 1–6 according to the present invention excelled over those of the triangular-pyramidal cube-corner retroreflective sheeting of the Comparative Example based on conventional technology, in both retroreflectivity in the front direction and retroreflective characteristics in directions of large entrance angles.

Furthermore, the observation angularity (observation angle=1.0°) of the retroreflective device (retroreflective sheeting) in which a large number of the complex cube-corner retroreflective elements were arranged in the closest-packed state, which was prepared from the master mold in which a large number of complex cube-corner retroreflective elements with vertical angles deviated in various manner as described in Example 4 were arranged in closest-packed state, excelled over observation angularity of other retroreflective devices which were not given such vertical angle deviations.

TABLE 1

| Observation angle | Entrance angle | Example 1 | Example 2 | Example 3 | Example 4 | Example 5 | Example 6 | Comparative Example |
|---|---|---|---|---|---|---|---|---|
| 0.2° | 5° | 780 | 797 | 631 | 562 | 720 | 704 | 493 |
|  | 10° | 700 | 747 | 574 | 497 | 704 | 689 | 470 |
|  | 20° | 400 | 550 | 374 | 306 | 545 | 544 | 280 |
|  | 30° | 300 | 362 | 287 | 211 | 420 | 430 | 207 |
|  | 40° | 250 | 270 | 216 | 199 | 345 | 350 | 192 |
|  | 50° | 150 | 169 | 135 | 118 | 321 | 329 | 104 |
| 1.0° | 5° | 45 | 43 | 43 | 89 | 39 | 44 | 37 |

What is claimed is:

1. A retroreflective device in which a large number of complex cube-corner retroreflective elements are arranged in closest-packed state, each of said complex cube-corner retroreflective elements having a first and second triangular-pyramidal retroreflective units and at least one tetrahedral retroreflective unit, characterized in that the three reflective lateral faces (a1, b1, c1 and a2, b2, c2) of each of the first and second triangular-pyramidal retroreflective units form mutually perpendicular cube-corner reflective surfaces, respectively, the first reflective lateral face (f11), the second reflective lateral face (e11) and the third reflective lateral face (g11) of said at least one tetrahedral retroreflective unit form a mutually perpendicular cube-corner reflective surfaces, said first reflective lateral face (a1) of the first triangular-pyramidal retroreflective unit is on the same plane with the first lateral face (f11) of said tetrahedral retroreflective unit, said second reflective lateral face (b1) of the first triangular-pyramidal retroreflective unit is on the same plane with the second lateral face (e11) of said tetrahedral retroreflective unit, said complex cube-corner retroreflective element has a quadrangular circumference defined by mutually parallel y-lines and mutually parallel z-lines, said complex cube-corner retroreflective element has a substantially symmetrical V-shaped groove with its center line x-x' passing through the points of intersection of said parallel y-lines and parallel z-lines, the third reflective lateral face (c1) of said first triangular-pyramidal retroreflective unit is parallel to one of the two lateral faces (g11) forming said V-shaped groove, the third reflective lateral face (c2) of said second triangular-pyramidal retroreflective unit is identical with, or parallel to, the other (g21) of the two faces forming said V-shaped groove, and the third reflective lateral face (g11) of said tetrahedral retroreflective unit is same as one of the two faces forming said V-shaped groove.

2. A retroreflective device according to claim 1, in which all of the tetrahedral retroreflective units form pairs of rotation symmetrical configuration mutually rotated by 180° and said complex cube-corner retroreflective elements have a rotation symmetrical configuration.

3. A retroreflective device according to claim 1, in which at least one tetrahedral retroreflective unit is not in a rotation symmetrical configuration rotated by 180°.

4. A retroreflective device according to any one of claims 1–3, which is characterized in that the optical axis is tilted in such a manner, where the point of intersection of a perpendicular line drawn from apex (H) of the tetrahedral retroreflective unit having one of its base lines on x-x' line with Sx plane determined by x-x' line group is represented by P and the point of intersection of the optical axis of same tetrahedral retroreflective unit with said Sx plane is represented by Q, that the distance (q) from x-x' line to point Q and the distance (p) from x-x' line to point P are not the same.

5. A retroreflective device according to claim 4, which is characterized in that the optical axis is tilted in such a manner, where the point of intersection of a perpendicular line drawn from apex (H) of the tetrahedral retroreflective unit having one of its base lines on x-x' line with Sx plane determined by x-x' line group is represented by P, and the point of intersection of the optical axis of said tetrahedral retroreflective unit with said Sx plane is represented by Q, that the distance (q-p) between the distance (q) from x-x' line to point Q, and the distance (p) from x-x' line to the point P, takes a positive value.

6. A retroreflective device according to claim 5, which is characterized in that the optical axis is tilted by 0.5°–30° in the direction, where the point of intersection of a perpendicular line drawn from an apex (H) of the tetrahedral retroreflective unit having one of its base lines on x-x' line with the Sx plane determined by x-x' line group is represented by P, and the point of intersection of the optical axis of said tetrahedral retroreflective unit with said Sx plane is represented by Q, that the difference between the distance (q) from the x-x' line to the point Q and the distance (p) from the x-x' line to the point P, i.e., (q-p), takes a positive (+) value.

7. A retroreflective device according to claim 6, which is characterized in that the optical axis is tilted by 5°–20° in the direction, where the point of intersection of a perpendicular line drawn from an apex (H) of the tetrahedral retroreflective unit having one of its base lines on x-x' line with the Sx plane determined by x-x' line group is represented by P, and the point of intersection of the optical axis of said tetrahedral retroreflective unit with said Sx plane is represented by Q, that the difference between the distance (q) from the x-x' line to point Q and the distance (p) from the x-x' line to the point P, i.e., (q-p), takes a positive (+) value.

8. A retroreflective device according to claim 7, which is characterized in,
where the distance from an apex (H) of the tetrahedral retroreflective unit to Sx plane determined by the x-line group is expressed as hx; the distance from the same apex to Sy plane defined by the y-line group, as hy; the distance to Sz plane defined by the z-line group, as hz; and that to Sw plane defined by w-line group determined by base line of the fourth reflective lateral face (d1 or d2) of said tetrahedral retroreflective unit, as hw, that hx is not equal to at least either one of hy and hz, and hw is not equal to at least either one of hy and hz.

9. A retroreflective device according to claim 8, which is characterized in that hx of the tetrahedral retroreflective unit is greater than at least either one of hy and hz, and hw is greater than at least either one of hy and hz.

10. A retroreflective device according to claim 8 or 9, which is characterized in that the ratio of hx of the tetrahedral retroreflective unit having one of its base lines on x-x' line to at least either one of hy and hz is 1.05–1.5, and the ratio of hw to at least either one of hy and hz is 1.05–1.5.

11. A retroreflective device according to claim 10, which is characterized in that hx of the tetrahedral retroreflective unit having one of its base lines on x-x' line equals hw, hy equals hz, and the ratio of hx to hy is 1.05–1.5.

12. A retroreflective device according to claim 11, which is characterized in that the bottoms of at least one group of those substantially symmetrical V-shaped parallel groove groups (Vx, Vy, Vz and Vw) which are defined by said x-, y-, z- and w-line groups forming the triangular-pyramidal retroreflective units or tetrahedral retroreflective units, are formed of a flat surface or a curved quadratic surface.

13. A retroreflective device according to claim 12, which is characterized in that deviation is given to at least one of the two lateral faces of at least one group of the substantially symmetrical V-shaped parallel groove groups (Vx, Vy, Vz and Vw) which are determined by the x-, y-, z- and w-line groups of triangular-pyramidal retroreflective units or tetrahedral retroreflective unit(s),
so that the prismatic vertical angles of the triangular-pyramidal retroreflective units or of the tetrahedral retroreflective unit(s) which are formed by said V-shaped parallel grooves are given a deviation of ±(0.001–0.1)° from 90°.

14. A retroreflective device according to claim 12, which is characterized in that deviation is given to at least one V-shaped parallel groove group among the substantially symmetrical V-shaped parallel groove groups (Vx, Vy, Vz and Vw) which are determined by the x-, y-, z- and w-line groups of the triangular-pyramidal retroreflective units or tetrahedral retroreflective unit(s), such that the vertical angles of the cube-corner reflective elements formed by said group of V-shaped parallel grooves show deviations of ±(0.001–0.1)° from 90°, in a pattern of repeating at least two different sets of deviations.

15. A retroreflective device according to claim 14, in which the angle formed by the x-line of the retroreflective device with an outer edge of a product formed of said retroreflective device is 5–85°.

16. A retroreflective device according to claim 15, in which the angle formed by the x-line of the retroreflective device with an outer edge of a product formed of said retroreflective device is 30–60°.

17. A retroreflective device according to claim 16, in which the retroreflective device has a first zone and a second zone, the angle formed by x1-line of said first zone with x2-line of said second zone being 5–175°.

18. A retroreflective device according to claim 17, in which the retroreflective device has a first zone and a second zone, the angle formed by x1-line of said first zone with x2-line of said second zone being 80–100°.

19. A retroreflective device according to claim 18, which is characterized in that many complex cube-corner retroreflective elements, each comprising first and second triangular-pyramidal retroreflective units and at least a pair of tetrahedral retroreflective units, are disposed in the closest-packed state,
said device being characterized in that all the tetrahedral retroreflective units have an identical shape and mutually form rotation symmetrical pair as rotated by 180° to one another, said complex cube-corner retroreflective elements have rotation-symmetrical configurations, where the point of intersection of a perpendicular line drawn from the apex (H) of the tetrahedral retroreflective unit having one of its base lines on x-x' line with Sx plane determined by x-x' line group is represented by P and the point of intersection of the optical axis of said tetrahedral retroreflective unit with said Sx plane is represented by Q, the optical axis is tilted by 5–20° in such direction that the difference between the distance (q) from x-x' line to the point Q and the distance (p) from x-x' line to the point P, i.e., (q-p), takes a positive (+) value, in the tetrahedral retroreflective unit having one of its base lines on said x-x' line, hx equals hw, hy equals hz, and the ratio of hx to hy is 1.05–1.5, and among the substantially symmetrical V-shaped parallel groove groups (Vx, Vy, Vz and Vw) determined by x-, y-, z- and w-line groups forming the triangular retroreflective units or the tetrahedral retroreflective units, at least one group of said grooves have bottoms formed of flat or quadratic plane.

* * * * *

UNITED STATES PATENT AND TRADEMARK OFFICE
CERTIFICATE OF CORRECTION

PATENT NO.     : 6,883,921 B2
DATED          : April 26, 2005
INVENTOR(S)    : Ikuo Mimura et al.

It is certified that error appears in the above-identified patent and that said Letters Patent is hereby corrected as shown below:

Title page,
Item [56], References Cited, FOREIGN PATENT DOCUMENTS, "63/143502" should read -- 63-143502 -- and "11/305017" should read -- 305017 --.

Column 1,
Line 26, "tracks or" should read -- tractors or --; and
Line 41, "form a" should read -- form --.

Column 2,
Line 27, "(ac)" should read -- ($\alpha$c) --; and
Lines 53, 55 and 56, "angurality" should read -- angularity --.

Column 3,
Line 55, "No. 4,138,488" should read -- No. 5,138,488 --.

Column 4,
Line 1, "distances" should read -- distance --;
Line 40, "angurality," should read -- angularity, --;
Line 49, "another of" should read -- another --; and
Line 60, "indicated" should read -- indicated: --.

Column 5,
Line 30, "pair" should read -- pairs --; and
Line 31, "element" should read -- elements --.

Column 7,
Line 3, "form a" should read -- form --.

Column 8,
Line 62, "inavoid-" should read -- unavoid- --.

Column 9,
Line 12, "drawings" should read -- drawings from --.

Column 10,
Line 33, "treversing" should read -- traversing --; and
Line 50, "form a" should read -- form --.

Column 12,
Line 17, "50mm" should read -- 50$\mu$m --.

UNITED STATES PATENT AND TRADEMARK OFFICE
CERTIFICATE OF CORRECTION

PATENT NO. : 6,883,921 B2
DATED : April 26, 2005
INVENTOR(S) : Ikuo Mimura et al.

It is certified that error appears in the above-identified patent and that said Letters Patent is hereby corrected as shown below:

Column 13,
Line 31, "lines of" should read -- lines on --.

Column 14,
Line 37, "threfrom." should read -- therefrom. --; and
Line 50, "difined" should read -- defined --.

Column 15,
Lines 18 and 24, "than" should read -- that --.

Column 16,
Line 31, "to" should read -- of --;
Line 51, "pliable" should read -- flexible --;
Line 57, "30-400 mm," should read -- 30-400 $\mu$m, --;
Line 58, "50-200 mm," should read -- 50-200 $\mu$m, --; and
Line 61, "hxhy" should read -- hx/hy --.

Column 17,
Line 58, "ad" should read -- and --; and
Line 62, "molded" should read -- molding --.

Column 20,
Line 25, after "Å." insert -- ¶ Examples --.

Column 21,
Line 14, "groove" should read -- grooves --;
Line 46, "withdrawn." should read -- removed. --; and
Line 64, "in y" should read -- in y- --.

Column 22,
Line 52, "V-shaped" should read -- V-shape --.

Column 24,
Line 39, "form a" should read -- form --.

UNITED STATES PATENT AND TRADEMARK OFFICE
CERTIFICATE OF CORRECTION

PATENT NO. : 6,883,921 B2
DATED : April 26, 2005
INVENTOR(S) : Ikuo Mimura et al.

It is certified that error appears in the above-identified patent and that said Letters Patent is hereby corrected as shown below:

Column 28,
Line 9, "plane." should read -- planes. --.

Signed and Sealed this

Twenty-seventh Day of September, 2005

JON W. DUDAS
*Director of the United States Patent and Trademark Office*